United States Patent
Hirose et al.

(10) Patent No.: US 8,586,243 B2
(45) Date of Patent: Nov. 19, 2013

(54) LEAD ACID STORAGE BATTERY

(75) Inventors: Yoshikazu Hirose, Tokyo (JP); Shinichi Sano, Tokyo (JP); Katsura Mitani, Tokyo (JP); Hiroyuki Wakatabe, Tokyo (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/144,764

(22) PCT Filed: Oct. 18, 2010

(86) PCT No.: PCT/JP2010/006154
§ 371 (c)(1),
(2), (4) Date: Sep. 2, 2011

(87) PCT Pub. No.: WO2012/053025
PCT Pub. Date: Apr. 26, 2012

(65) Prior Publication Data
US 2012/0094182 A1    Apr. 19, 2012

(51) Int. Cl.
*H01M 4/13*    (2010.01)
(52) U.S. Cl.
USPC .......................................... 429/225; 429/227
(58) Field of Classification Search
USPC ....................................................... 429/241
See application file for complete search history.

(56) References Cited

FOREIGN PATENT DOCUMENTS

| JP | 55-128263 | 10/1980 |
|---|---|---|
| JP | 02-114451 | 4/1990 |
| JP | 04-171666 | 6/1992 |
| JP | 4-171666 | * 6/1992 |
| JP | 2001-273905 | 10/2001 |

(Continued)

OTHER PUBLICATIONS

Written Opinion of International Searching Authority issued Jan. 18, 2011, for PCT/JP2010/006154; 3 pages; International Searching Authority, Japan.

(Continued)

*Primary Examiner* — Ula C Ruddock
*Assistant Examiner* — Jacob Marks
(74) *Attorney, Agent, or Firm* — Antonelli, Terry, Stout & Kraus, LLP.

(57) ABSTRACT

A lead acid storage battery composed of plates, the lead acid storage battery being obtained by packing an active material into a grid plate provided with a frame section having a quadrangular profile shape, and lateral grid strands and longitudinal grid strands that form a grid inside the frame section. The lateral grid strands are composed of thick lateral strands having a thickness equal to the thickness of the frame section, and thin lateral strands of smaller width and thickness than the thick strands, the longitudinal grid strands being composed of thick longitudinal strands that have a thickness that is less than thickness of the frame section, one end in the thickness direction being arranged in the same plane as one end of the frame section in the thickness direction, and thin longitudinal strands of smaller width and thickness than the thick longitudinal strands, end faces of one end side of the thin lateral strands and the thin longitudinal strands in the thickness direction being positioned further inward in the thickness direction than an end face of one end side of the frame section in the thickness direction, and end faces of the other end side of the thin lateral strands and the thin longitudinal strands in the thickness direction being positioned further inward in the thickness direction than an end face of another end side of the frame section in the thickness direction.

2 Claims, 9 Drawing Sheets

(56) References Cited

FOREIGN PATENT DOCUMENTS

| JP | 2001-332268 | 11/2001 |
|----|-------------|---------|
| JP | 2002-231302 | 8/2002 |
| WO | WO 2010/073588 A1 | 7/2010 |

OTHER PUBLICATIONS

International Search Report issued Jan. 18, 2011, for PCT/JP2010/006154; 3 pages; International Searching Authority, Japan.
Decision for Grant mailed Dec. 6, 2011, for Japanese application No. 2011-533458; 3 pages; Japanese Patent Office, Japan.

* cited by examiner

LEAD ACID STORAGE BATTERY

TECHNICAL FIELD OF THE INVENTION

The present invention relates to a lead acid storage battery.

PRIOR ART OF THE INVENTION

Lithium-ion batteries, nickel-hydrogen batteries, and other high-performance batteries are being developed as secondary batteries widely used in mobile telephones and in other applications. However, lithium ion batteries and nickel-hydrogen batteries are disadvantageous in terms of price, and in the particular case of lithium ion batteries, sufficient consideration must be given to safety issues. Therefore, lead acid storage batteries are widely used as batteries used in backup power sources disposed in office buildings, hospitals, and the like in case of power outages; as industrial batteries for protection against instantaneous voltage drops; or as automotive batteries. Recently, power generation facilities using natural energy are being built with increasing frequency, as with power generation facilities that use solar cells or wind power generators; and the addition of storage batteries using secondary batteries in such power generation facilities is being considered in order to provide more stable leveling of power. In such storage facilities, it is advantageous to use a lead acid storage battery as the battery because a large number of batteries are required.

Lead acid storage batteries commonly have a structure in which a group of plates configured by layering positive plates and negative plates with interjacent separators is accommodated in a container together with an electrolyte. Plates of a tubular-type, pasted-type, Tudor-type or a variety of other structures may be used as the plate for a lead acid storage battery, but pasted plates that are capable of large current discharge are widely used in industrial and automotive lead acid storage batteries. Sealed lead acid storage batteries are widely used as industrial and automotive lead acid storage batteries because maintenance is facilitated and water addition is not needed.

The need for longer service life in lead acid storage batteries has increased in recent years. In particular, in storage equipment provided as accessory equipment to power generation equipment that uses natural energy, there is a need for the service life of a lead acid storage battery to be the same length (e.g., 17 years or more) as the service life of a wind power generation apparatus, a solar cell, or other power generation means.

Pasted positive plates and negative plates have a structure in which positive active material and negative active material in the form of a paste are packed into and held by positive grid plates and negative grid plates constituting collectors. The positive grid plate and negative grid plate may be manufactured by die casting or by expanding a lead or lead alloy sheet, but in the case that emphasis is placed on extending the service life of the battery, the cross-sectional area of the grid strands must be increased and it is therefore advantageous to use a grid plate manufactured by die casting as the positive grid plate and a negative grid plate, as described below.

A grid plate manufactured by die casting has a substantially quadrangular (rectangular or square) profile shape as described in, e.g., Japanese Laid-open Patent Application No. 2001-332268, and is composed of a frame section having a pair of lateral frame strands that extend in the lateral direction and are in an opposing arrangement in the longitudinal direction, and a pair of longitudinal frame strands that extend in the longitudinal direction and that are in an opposing arrangement in the lateral direction; and a plurality of longitudinal grid strands and a plurality of lateral grid strands that form a grid inside the frame section; and a plate lug section integrally formed in one lateral frame strand of the frame section.

In the present specification, in order to facilitate identification of the parts of the grid plate and the plate, the portion of the grid plate on which the plate lug section is provided is the upper section of the grid plate, and the direction in which the longitudinal frame strand extends (the lengthwise direction of the longitudinal frame strand) is the longitudinal direction of the grid plate. Also, the direction in which the lateral frame strand extends is the lateral direction of the grid plate, and the direction perpendicular to the longitudinal and lateral directions of the grid plate is the thickness direction of the grid plate. The longitudinal, lateral, and thickness directions of the plate are directions along the longitudinal, lateral, and thickness directions, respectively, of the grid plate. In relation to the frame strands and grid strands, the direction along the thickness direction of the grid plate is the thickness direction, and the direction perpendicular to the lengthwise direction and the thickness direction is the width direction. Furthermore, the surface of the grid plate facing upward and the surface facing downward are referred to as the top surface and the reverse surface, respectively, of the grid plate when the grid plate is laid down on a lateral plane and the active material is to be packed into the grid plate.

When active material is packed into a positive grid plate and negative grid plate to manufacture a positive plate and a negative plate, the grid plate is laid down (a state in which the thickness direction is oriented in the longitudinal direction) and sent into a paste packing machine, active material in the form of a paste is fed to the grid plate from above, the active material thus fed is made to flow from the top surface (the surface facing upward above the grid plate) of the grid plate to the reverse surface (the surface facing downward below the grid plate) side via the grid to pack the active material into the entire grid. In order to uniformly pack the active material into the entire grid, a sufficient amount of active material must be fed from the top surface side of the grid plate to the reverse surface side of the predetermined via the grid, and the flow of the active material must then be made to flow smoothly to the reverse surface side of the grid plate.

The lateral grid strands and longitudinal grid strands of the grid plate (the positive plate in particular) are ideally completely embedded in the active material in order to extend the service life of the lead acid storage battery. In a state in which a portion of the grid strands of the positive grid plate are exposed from the active material, the portions of the grid strands exposed from the active material (referred to as exposed portions of the grid strands) come into direct contact with sulfuric acid as the electrolyte. Therefore, a discharge reaction occurs on the surface of the exposed portion of the grid strands during discharge, and passive lead sulfate ($PbSO_4$) film is formed on the surface of the exposed portions of the grid strands. In the particular case that grid strands are formed from a lead acid alloy that contains calcium, a discharge reaction is generated on the surface of the grid strands and a lead sulfate film is readily formed when the surface of the grid strands comes into direct contact with the electrolyte because the surface of the grid strands is activated.

The passive film formed on the surface of the grid strands does not have electroconductivity and the grid strands do not return to their original state even when charging has been carried out. When a portion of the grid strands of the positive grid plate is exposed from the active material, electrolyte penetrates the boundary between the active material and the grid strands from the exposed portions, and the formation of a passive film on the surface of the grid strands is therefore accelerated to a point where the passive film is formed over the entire surface of the grid strands. Conductivity between the grid strands and the active material is obstructed when a passive film is formed on the entire surface of the grid strands. Therefore, charging is no longer possible, which leads to premature capacity loss (PCL) of the battery and the loss of ability to respond to demand when the service life of the battery is prolonged.

When the components of the lead acid storage battery degrade with use over time, the lead acid storage battery eventually reaches the end of its service life. A main cause that brings a lead acid storage battery to the end of its service life is corrosion (generation of $PbO_2$ by oxidation) of the grid plate that occurs on the positive plate during charging. The generation of $PbO_2$ on the positive grid plate gradually advances from the surface of the grid plate into the interior thereof. $PbO_2$ has electroconductivity, on the other hand the mass of it is fragile. Therefore, the grid strands break when corrosion of the grid strands progresses, the grid strands lose their shape, the function for holding the active material is lost, and eventually the battery reaches the end of its service life. Therefore, the cross-sectional area of the grid strands and the frame section of the grid plate must be sufficiently increased in order to increase the time until corrosion of the grid plate extends to the entire grid plate and to extend the service life of the lead acid storage battery.

As described above, the cross-sectional area of the grid strands of the grid plate (the positive grid plate in particular) must be sufficiently increased in order to extend the service life of a lead acid storage battery that uses a pasted plate, and the portions of the grid strands exposed from the active material must be minimized to the extent possible.

The amount of active material required to obtain a predetermined battery capacity cannot be packed into the grid plate because the gaps between the grid strands is reduced when the cross-sectional area of all the grid strands is increased in order to extend the service life of the plate. A problem is also presented when the cross-sectional area of the grid strands is increased in that a sufficient amount of active material cannot be fed to the reverse surface side of the grid plate when the active material is being packed, and exposed portions of the grid strands readily appear on the reverse surface side of the grid plate because the gaps between the grids are reduced and it is difficult to cause the active material to flow smoothly from the top surface side of the grid plate to the reverse surface side when the active material is being packed into the grid plate.

There is proposed a grid plate in Japanese Laid-open Patent Application No. 4-171666 in which the grid strands are composed of thick strands and thin strands and the thick strands are endowed with mechanical strength. In the grid plate, flow of active material from the top surface side to the reverse side of the grid plate can be facilitated because gaps in the grid can be enlarged by using thin strands as a portion of the grid strands.

However, a problem is presented with this grid plate in that it is difficult to cover the end faces of the thick strands and thin strands in the thickness direction with active material when the active material is being packed into the grid plate because the thickness of all the thick strands and the thickness of the thin strands are set to be the same thickness as the frame section. The active material is readily packed so as to completely cover the grid strands into the top surface side of the grid plate to which active material is directly fed from the paste packing machine when the active material is being packed into the grid plate using a paste packing machine. However, it is difficult to cover exposed portions of the grid strands because the active material is packed on the reverse surface side of the grid plate depending entirely on the flow of the active material that passes through the gaps in the grid.

The plates for a lead acid storage battery are manufactured in an active material packing step in which feed rollers are brought into frictional contact with the grid plates from above the grid plates placed on a conveyor belt, the grid plates are fed into the paste packing machine while being held between the conveyor belt and the feed rollers, and the active material is packed into the grid plates by the paste packing machine. After the active material packing step has been completed, an active material compression step is carried out in which the grid plates packed with active material (namely plates) are passed between pressure rollers and feed rollers in a longitudinally opposing arrangement, and the active material packed into the grid plate is compressed in the thickness direction of the plate. In the active material compression step, a flow of active material, albeit slight, can be produced on the top surface side and the reverse surface side of the plates. Therefore, when there are exposed portions of the grid strands on the reverse surface side of the plate at the stage in which active material has been packed into the grid plate by the paste packing machine, the exposed portions can be covered with active material in the active material compression step as long as the surface area of the exposed portions is sufficiently low. However, in the case that the surface area of the exposed portions of the grid strands that are present on the reverse surface side of the plate is high, it may not be possible to completely cover the exposed portions of the grid strands with active material depending on the flow of the active material produced in the active material compression step.

With the grid plate described in Japanese Laid-open Patent Application No. 4-171666, since the end faces of the thick strands and thin strands in the thickness direction are arranged on the same plane as the end faces of the frame section on the reverse surface side of the grid plate, the end faces of the thick strands and the thin strands in the thickness direction are exposed on the reverse surfaces side of the grid plate when the active material packing step has been completed, and it is impossible to prevent the surface area of the exposed portions of the grid strands from increasing. Thus, when the exposed portions of the grid strands have a large surface area on the reverse surface side of the grid plate at the point when the active material packing step has ended, it is difficult to completely cover the exposed portions of the grid strands with active material in the active material compression step carried out thereafter, and there is a greater possibility that exposed portions of the grid strands will remain exposed. A passive film is formed on the grid strands as described above when there are exposed portions of the grid strands in the positive plate, and the formation of the passive film leads to premature capacity loss in a battery.

In view of the above, the present inventor has proposed in WO (International Publication) 2010/73588 a grid plate in which the grid strands are composed of thick strands and thin strands, thereby making it possible to avoid a reduction in the amount of active material packed into the grid plate, to facilitate the flow of active material when the active material is packed, and to reduce the possibility of the end faces of the grid strands from becoming exposed from the active material on the reverse surface side of the plate.

The grid plate proposed in prior art by the present inventor has the following configuration.

a. At least one among the longitudinal grid strands and the lateral grid strands is composed of thick strands and thin strands, and the thick strands and thin strands are arrayed so that the grid strands adjacent to the thick strands are thin strands.

b. The thickness of the thick strands is set to be less than the thickness of the frame section, and the end faces of one end side and the end faces of the other end side in the thickness direction of the thick strands are arranged further inward in the thickness direction than the end faces of one end side and the end faces of the other end side in the thickness direction of the frame section.

c. The width and thickness of the thin strands are set to be less than the width and thickness of the thick strands, and the thin strands are provided in a state in which the end faces of one end side of the thin strands in the thickness direction are positioned offset from the plane in which the end faces of one end side of the thick strands in the thickness direction are arranged.

As described above, when at least one among the longitudinal grid strands and the lateral grid strands is composed of thick strands and thin strands, the function of the grid plate for holding the active material can be maintained over an even longer period of time than the case in which all of the grid strands are composed of thin strands, because the thick strand portions that can withstand corrosion over a longer period of time can be endowed with mechanical strength and the shape of the grid can be maintained, even when the mechanical strength of the thin strands has been reduced due to the progression of corrosion.

As described above, when thick strands and thin strands are arrayed so that the grid strands adjacent to the thick strands are thin strands, the active material can be made to flow smoothly to the reverse surface side of the grid plate and the active material can be packed in a highly satisfactory manner on the reverse surface side of the grid plate, because a large space for allowing the active material paste to flow around the sides of the thick strands can be assured.

Furthermore, when the grid plate is configured in the manner described above, the end faces of the thin strands and thick strands are arranged further inward from the end faces of the frame section on the reverse surface side of the grid plate. It is therefore possible to reduce the possibility that the end faces of the thin strands and thick strands will remain exposed from the active material on the reverse surface side of the grid plate.

Problems the Invention is Intended to Solve

When the grid plate proposed by the present inventor in the prior art is used, the service life of a battery can be extended because the thick strand portions that can withstand long-term corrosion are provided with mechanical strength and the shape of the grid can be maintained for a long period of time. The possibility that a passive film composed of lead sulfate will be formed on the grid strands is reduced and the service life of the battery can be extended because the possibility that exposed portions will appear in the grid strands is reduced.

However, later verification has made it apparent that in the case that the grid plate proposed in prior art by the present inventor is used, the grid plates can no longer be fed in the correct orientation to the paste packing machine and problems that stop the production line occur with a frequency that cannot be ignored when a series of grid plates is fed sequentially fed to a paste packing machine and plates are to be mass produced.

When active material paste is to be packed into the grid plate in the production line for mass producing plates using rectangular grid plates, the series of grid plates is laid down with the lateral direction (short-side direction) facing the conveyance direction, and is conveyed by the conveyor belt toward the paste packing machine. Feed rollers make frictional contact from above with the grid plates thus conveyed when the grid plates approach the paste packing machine, and the grid plates are fed into the paste packing machine while held between the feed rollers and the conveyor belt.

In the grid plate proposed in the prior art, the two ends of the thick strands in the thickness direction are arranged further inward from the two ends of the frame section in the thickness direction, and the two ends of the thin strands in the thickness direction are also arranged further inward from the two ends of the frame section in the thickness direction. Therefore, the two ends of the entire grid section are in a recessed state further inward that the two ends of the frame section in the thickness direction. For this reason, the conveyor belt and the feed rollers are in frictional contact with only the frame section of the grid plate when the grid plate is fed into the paste packing machine. When the conveyor belt and the feed rollers can make contact with only the frame section of the grid plate, the frictional contact between the grid plate and the feed rollers and between the grid plate and the conveyor belt is insufficient. Therefore, it may not be possible to feed the grid plate into the paste packing machine in the correct orientation. The grid plate may deform and the active material cannot be normally packed into the grid plate when the grid plate cannot be fed into the paste packing machine in the correct orientation. Such a plate cannot be used in the lead acid storage battery assembly step because the plate obtained by packing the active material into a grid plate which has been fed to the paste packing machine in an incorrect orientation is a defective product. Therefore, the production line must be temporarily stopped and such a grid plate must be rejected from the production line when the grid plate cannot be fed to the paste packing machine in the correct orientation.

As described above, there is a possibility of loss of production efficiency because problems that cause the production line to be stopped occur with a frequency that cannot be ignored in the case that the grid plate proposed in the prior art is used. It is important that the grid plates be reliably fed to the paste packing machine while the grid plates are kept in the correct orientation in order to increase the yield of lead acid storage batteries, improve productivity, and obtain a high-quality plate.

SUMMARY OF THE INVENTION

An object of the present invention is to provide a lead acid storage battery having excellent mass productivity and long service life.

Means for Solving these Problems

The present invention relates to a lead acid storage battery provided with a positive plate in which positive active material is packed into a positive grid plate, and a negative plate in which negative active material is packed into a negative grid plate. In the present invention, at least a positive grid plate is composed in the following manner.

(1.1) The positive grid plate has a pair of lateral frame strands that extend in a lateral direction and are in an opposing arrangement in a longitudinal direction, and a pair of longitudinal frame strands that extend in the longitudinal direction and that are in an opposing arrangement in the lateral direction; and is provided with a frame section having a fixed thickness dimension in a thickness direction perpendicular to the lateral direction and the longitudinal direction, a plurality of lateral grid strands and a plurality of longitudinal grid strands that are provided so as to extend parallel to the lateral frame strands and the longitudinal frame strands, respectively, and form a grid inside the frame section, and a plate lug section integrally formed on one lateral frame strand of the frame section.

(1.2) The longitudinal grid strands and lateral grid strands respectively have a plurality of thin longitudinal strands and thin lateral strands, and a plurality of thick longitudinal strands and thick lateral strands that have a greater cross-sectional surface area than the thin longitudinal strands and thin lateral strands; and the thick longitudinal strands and thin longitudinal strands, and the thick lateral strands and thin lateral strands are arrayed so that at least one thin longitudinal strand is aligned with a side of the thick longitudinal strands, and a plurality of thin lateral strands are aligned with a side of the thick lateral strands.

(1.3) The plurality of thick longitudinal strands has a thickness that is less than the thickness of the frame section, the thick longitudinal strands being arranged so that an end face of one end side thereof in the thickness direction is positioned in the same plane as an end face of one end side of the frame section in the thickness direction, and an end face of another end side thereof in the thickness direction is positioned further inward of the frame section in the thickness direction than an end face in another end side of the frame section in the thickness direction.

(1.4) The plurality of thin longitudinal strands has a thickness that is less than the thickness of the thick longitudinal strands, the thin longitudinal strands being arranged so that an end face of one end side thereof in the thickness direction and an end face of another end side thereof in the thickness direction are positioned further inward of the frame section in the thickness direction than the end face of the one end side and the end face of the another end side of the thick longitudinal strands in the thickness direction.

(1.5) The plurality of thick lateral strands have a thickness equal to the thickness of the frame section, the thick lateral strands being arranged so that an end face thereof on one end side in the thickness direction and an end face thereof on another end side in the thickness direction are positioned in the same plane as an end face of one end side and an end face of another end side of the frame section in the thickness direction, respectively.

(1.6) A width dimension of the end face of the another end side of the thick lateral strands in the thickness direction is set to be less than a width dimension of the end face of the one end side in the thickness direction thereof, where a direction perpendicular to the thickness direction and the lengthwise direction thereof is taken as the width direction.

(1.7) The plurality of thin lateral strands has a thickness that is less than the thickness of the thick lateral strands, the thin lateral strands being arranged so that an end face thereof on one end side in the thickness direction and an end face thereof on another end side in the thickness direction are positioned further inward of the frame section in the thickness direction than the end face of the one end side and the end face of the another end side of the thick lateral strands in the thickness direction.

When the grid plate is configured in the manner described above, one end of the thick lateral strands in the thickness direction and one end of the thick longitudinal strands in the thickness direction can be positioned in the same plane as the end faces of one end side of the frame section in the thickness direction. Therefore, sufficient contact surface area can be obtained between the feed rollers and the grid plate, and frictional resistance between the feed rollers and the grid plate can be increased when the grid plate is fed into the paste packing machine by the feed rollers. When configured in the manner described above, it is possible to increase the contact surface area between the grid plate and the conveyor belt, and to increase the frictional resistance between the grid plate and the conveyor belt because the other end of the thick lateral strands in the thickness direction can be positioned in the same plane as the end faces of the other end side of the frame section in the thickness direction. Therefore, the grid plate can be reliably fed into the paste packing machine and the operation for packing active material into the grid plate can be smoothly carried out in a state in which the frictional resistance between the grid plate and the feed rollers and between the grid plate and the conveyor belt has been increased, and the grid plate is kept the proper orientation in which the lateral direction of the grid plate faces the conveyance direction when the grid plate is held between the conveyor belt and the feed rollers and fed to the paste packing machine.

In the grid plate used in the lead acid storage battery according to the present embodiment, the end faces of the thick lateral strands and the thick longitudinal strands in the thickness direction are arranged in the same plane as the end faces of one end side of the frame section in the thickness direction on the top surface (the surface facing upward when the active material is being packed) side of the grid plate. Therefore, the frame strands, the thick lateral strands, and thick longitudinal strands constitute numerous rectangular partitioning frames that are longitudinally and laterally aligned and in which the top surface of the grid plate is open, and these partitioning frames longitudinally and laterally partition the surface of the grid plate. When the surface of the grid plate is so partitioned by the numerous partitioning frames, the active material can be made to smoothly and uniformly flow from the top surface side of the grid plate to the reverse surface side because the pressure for packing the active material applied to the surface of the grid plate can be reliably and uniformly transmitted without dissipation through limited regions inside the partitioning frames to the reverse surface side of the grid plate, and the active material can be satisfactorily packed on the reverse surface side of the grid plate.

After the active material has been packed into the grid plate, an active material compression step for compacting the thus-packed active material is carried out by passing the grid plate between compression rollers and feed rollers. At this point, partitioning frames composed of the frame section, the thick lateral strands, and the thick longitudinal strands act so as to uniformly transmit the pressure applied by the pressure rollers to the grid plate to each part of the grid plate. Therefore, it is possible to obtain a high-quality plate in which the active material is uniformly packed and compacted throughout the grid plate.

In the grid plate used in the lead acid storage battery according to the present invention, the end faces of the thick lateral strands and thick longitudinal strands in the thickness direction are arranged in the same plane as the end faces of the frame section in the thickness direction on the top surface side of the grid plate (the surface to which active material is fed from the paste packing machine when the active material is being packed into the grid plate; the upward facing surface). However, active material is readily applied in excess of the thickness of the frame section so as to hide the thick lateral strands and the thick longitudinal strands when the active material is being packed into the grid plate on the top surface side. Therefore, the active material is readily packed into the grid plate so that the thick lateral strands and thick longitudinal strands are not exposed, even when the end faces of the thick lateral strands and thick longitudinal strands in the thickness direction and the end faces of the frame section in the thickness direction are arranged in the same plane.

Only the end faces of the thick lateral strands in the thickness direction are arranged in the same plane in which the end faces of the frame section in the thickness direction are arranged on the reverse surface side of the grid plate. It is difficult to completely cover the end faces of the strands exposed on the reverse surface side of the grid plate by only the flow of active material from the top surface side to the reverse surface side of the grid plate. However, in the present invention, the surface area of the exposed portion can be sufficiently reduced when the end faces of the thick lateral strands in the thickness direction are exposed on the reverse surface side of the plate when the active material packing step has ended, because the width dimension of the end faces of the thick lateral strands in the thickness direction on the reverse surface side of the grid plate is set to be less than the width dimension of the end faces of the thick lateral strands in the thickness direction on the top surface side of the grid plate. Accordingly, even when the end faces of the thick lateral strands are exposed on the reverse surface side of the plate at the end of the active material packing step, the exposed portions of the thick lateral strands can be reliably covered with active material and a plate that does not have exposed portions of the grid strands on the top and reverse surface sides of the grid plate can be readily obtained by using the flow of active material produced in the active material compression step carried out thereafter. Furthermore, a comparison made of the grid plate according to the present invention and the grid plate disclosed in WO (International Publication) 2010/73588 with the size (thickness) of the thick longitudinal strands kept the same reveals that whereas in the grid plate disclosed in WO (International Publication) 2010/73588, the thick longitudinal strands are arranged so that the end faces thereof in the thickness direction are positioned further inward of the frame section in the thickness direction than the end faces of the frame section on the top surface side of the grid plate, in the present invention, the thick longitudinal strands are arranged so that the end faces of the thick longitudinal strands in the thickness direction are positioned even further inward in the thickness direction than the grid plate disclosed in WO (International Publication) 2010/73588 on the reverse surface side of the grid plate of the present invention. This is because the end faces of the thick longitudinal strands in the thickness direction and the end faces of the frame section are arranged in the same plane on the top surface side of the grid plate. Flow space for the active material can thereby be sufficiently obtained on the reverse surface side of the grid plate, which is useful for improving the packing characteristics of the active material.

In a preferred mode of the present invention, the plurality of thin longitudinal strands and thin lateral strands has a cross-sectional area set so that the lead acid storage battery can withstand corrosion for a predetermined service life period.

When the cross-sectional area of the thin longitudinal strands and the thin lateral strands are set in the manner described above, the shape of the grid plate can be reliably maintained over the service life period and the grid plate can be provided with a collector function. Therefore, battery can be kept in a state of high performance over the service life period.

Effect of the Invention

In accordance with the present invention, one end of the thick lateral strands in the thickness direction and one end of the thick longitudinal strands in the thickness direction are positioned on the top surface side of the grid plate in the same plane as the end faces of one end side of the frame section in the thickness direction; and the other end of the thick lateral strands in the thickness direction are arranged in the same plane as the end faces of the other end side of the frame section in the thickness direction on the reverse surface side of the grid plate. Therefore, sufficient contact surface area can be obtained between the feed rollers and the grid plate and between the conveyor belt and the grid plate, and the frictional resistance between the feed rollers and the grid plate and the frictional resistance between the conveyor belt and the grid plate can be sufficiently increased, when the grid plate held between the feed rollers and the conveyor belt and fed into the paste packing machine. For this reason, the grid plate can be reliably fed into the paste packing machine with the grid plate kept in the correct orientation, and the operation for packing active material into the grid plate can be correctly and smoothly carried out. Therefore, not only is it possible to prevent the manufacture of plates with defective active material packing and to increase product yield, but it is also possible to prevent the production line from being stopped in the step for packing the active material into the grid plate and to improve the productivity of the lead acid storage batteries.

In the present invention, the end faces of the thick lateral strands and the thick longitudinal strands in the thickness direction are arranged in the same plane as the end faces of the frame section in the thickness direction; and the frame section, the thick lateral strands, and the thick longitudinal strands constitute numerous partitioning frames aligned in the longitudinal and lateral direction on the top surface side of the grid plate. Therefore, the pressure for packing the active material can be reliably and uniformly transmitted without dissipation from the top surface side of the grid plate through the partitioning frames to the reverse surface side. Therefore, the flow of active material from the top surface side to the reverse surface side of the grid plate is smoothly carried out in a uniform fashion, and the active material can be satisfactorily packed on the reverse surface side of the grid plate. In the active material compression step carried out after the active material has been packed into the grid plate, pressure applied by the pressure rollers to the grid plate can be uniformly transmitted to all parts through the partitioning frames formed by the frame section, the thick lateral strands, and the thick longitudinal strands. Therefore, it is possible to obtain a high-quality plate in which the active material is uniformly packed and compacted throughout the grid plate.

In the present invention, the width dimension of the end faces of the thick lateral strands in the thickness direction on the top surface side of the grid plate (the end faces of one end side of the thickness direction) is set to be greater than the width dimension of the end faces of the thick lateral strands in the thickness direction on the reverse surface side of the grid plate (the end faces of the other end side in the thickness direction). Therefore, the surface area of the exposed portions of the thick lateral strands produced on the reverse surface side of the plate at the completion of the active material packing step can be reduced. Accordingly, even when there are exposed portions of the thick lateral strands on the reverse surface side of the plate at the end of the active material packing step, the exposed portions of the thick lateral strands produced on the reverse surface side of the plate can be reliably covered with active material by using the flow of active material produced in the active material compression step carried out thereafter. Therefore, a plate that does not have exposed portions of the grid strands on the top and reverse surface sides of the grid plate can be readily obtained, and it is possible to readily obtain a lead acid storage battery with long service life without having exposed portions of the grid strands in the positive plate.

DETAILED DESCRIPTION OF THE PREFERRED EMBODIMENTS

Embodiments of the present invention are described in detail below with reference to the drawings.

Figure 9:
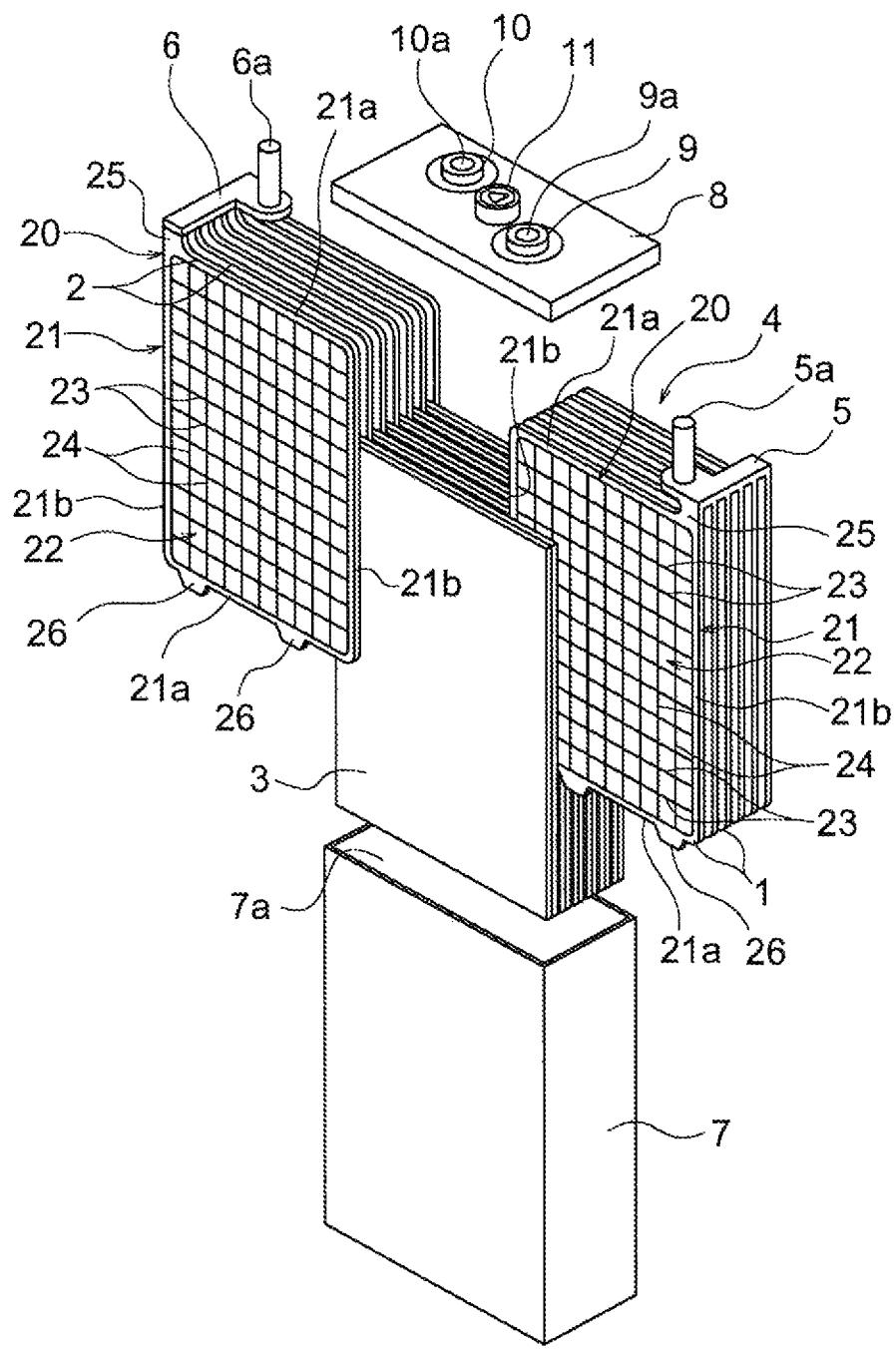
FIG. 9 is an exploded perspective view showing an example of the configuration of a lead acid storage battery.

FIG. 9 is an exploded view showing an example of the structure of a valve regulated lead acid storage battery. In the diagram, reference numerals 1 and 2 are a positive plate and a negate plate, respectively, 3 is a separator, and a plate group 4 is composed of positive plates 1 and negative plates 2 that are layered in alternating fashion with interjacently disposed separators 3.

In FIG. 9, the positive plates 1, 1, ..., the negative plates 2, 2, ..., and separators 3, 3, ... are offset in position in order to facilitate understanding of the structure, but the positive plate 1 and the negative plate 2 are actually layered in alternating fashion with interjacently disposed separators 3 in accordance with the positions of the positive plates and the negative plates. Reference numeral 5 is a positive strap for connecting the plate lug sections provided to a plurality of a positive plates 1, 1, ...; reference numeral 6 is a negative strap for connecting the plate lug portions provided to a plurality of negative plates 2, 2, ...; and a positive pole 5a and a negative pole 6a are provided to the positive strap 5 and the negative strap 6, respectively.

The plate group 4 is accommodated together with an electrolyte in a cell chamber 7a of a container 7. The opening at the upper end of the container 7 is closed off by a lid 8, and the positive pole 5a and negative pole 6a are drawn out to the exterior via holes provided in a positive terminal bushing 9 and a negative terminal bushing 10, respectively, formed by die casting in the lid 8. A vent plug 11 is mounted on the lid 8 and the vent plug opens and releases pressure inside the container when the pressure inside the container has exceeded a specified value.

Since the example shown in FIG. 9 is a single cell, only one cell chamber is provided to the container 7, and in the case that the rated voltage of the battery greater than 2V, a plurality of cell chambers is arranged in the container 7, a plate group is inserted into each cell chamber, and the spaces between straps, which have predetermined polarity, of the plate groups inserted into adjacent cell chambers are mutually connected via inter-cell connection parts provided through the partition walls, whereby the cells constituted in each of the plurality of cells are connected in parallel or in series to constitute a lead acid storage battery having a predetermined rated voltage and rated capacity.

The positive plate 1 and negative plate 2 have a structure in which a positive active material and a negative active material are packed into and held by positive grid plate and a negative grid plate constituting collectors. The grid plate constituting the collector may be manufactured by casting or by expanding a lead or lead alloy sheet, but in the present invention, the grid plate is manufactured by casting.

The grid plate used in the lead acid storage battery according to the present invention may be formed from an alloy containing lead as the main material to which tin, calcium, antimony, sodium, or other alloy material has been added. It is particularly preferred that tin and calcium be added as alloy material to the main material. The ratio of self-discharge can be reduced when calcium is added. When calcium is added to the main material (lead), there is a problem in that the grid strands readily corrode, but grid strand corrosion can be reduced by adding tin.

The grid plate is composed of a frame section, a grid disposed inside the frame section, and a plate lug section provided to the frame section. The frame section is composed of a pair of lateral frame strands in an opposing arrangement in the longitudinal direction, a pair of longitudinal frame strands in an opposing arrangement in the lateral direction, and a plate lug section provided to one of the lateral frame strands. The grid disposed inside the frame section is composed of lateral grid strands that extend parallel to the lateral frame strands, and longitudinal grid strands that extend parallel to the longitudinal frame strands.

Figure 1:
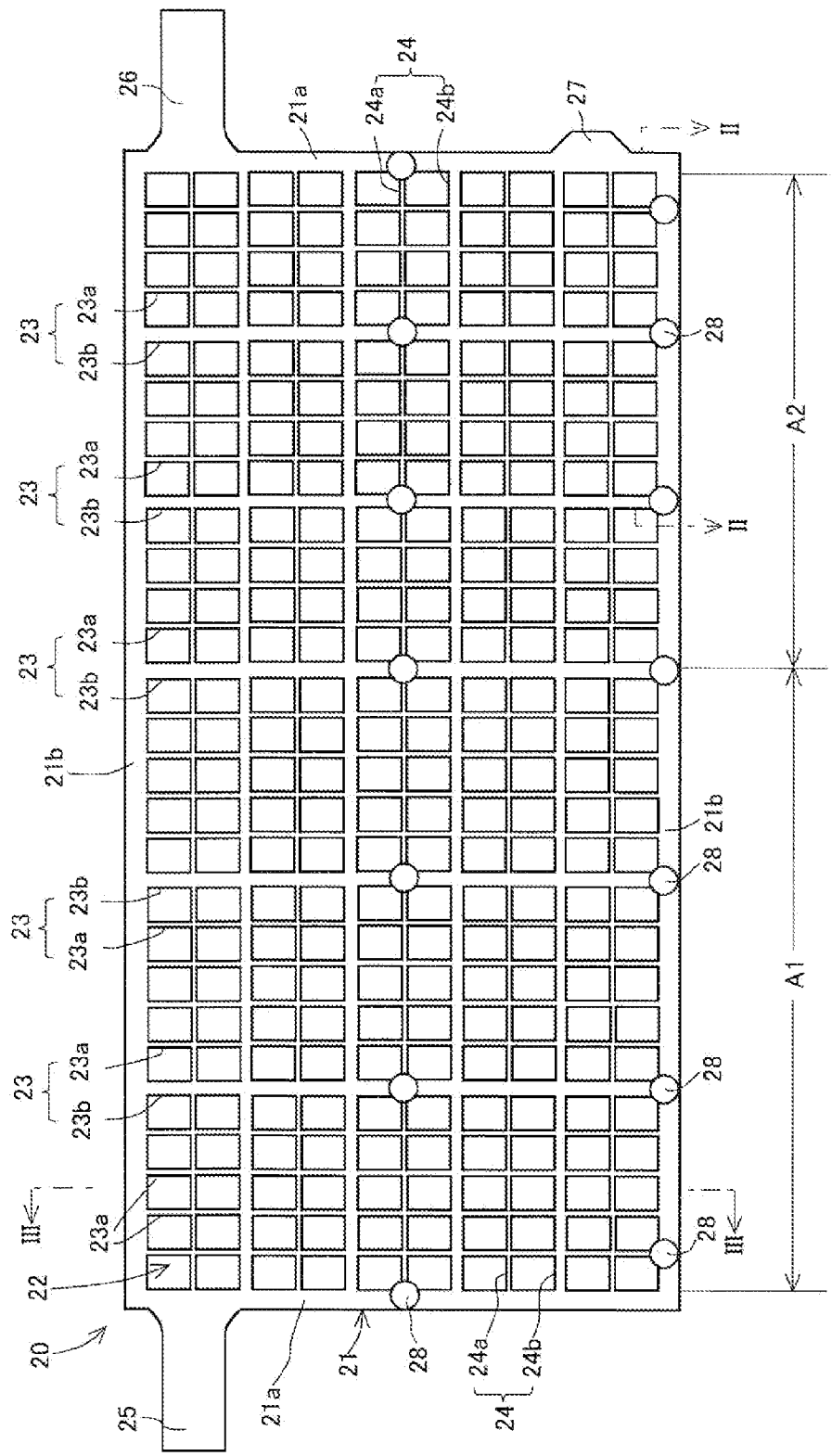
FIG. 1 is a front view showing a configuration example of the grid plate used in the lead acid storage battery according to the present invention.
Figure 4:
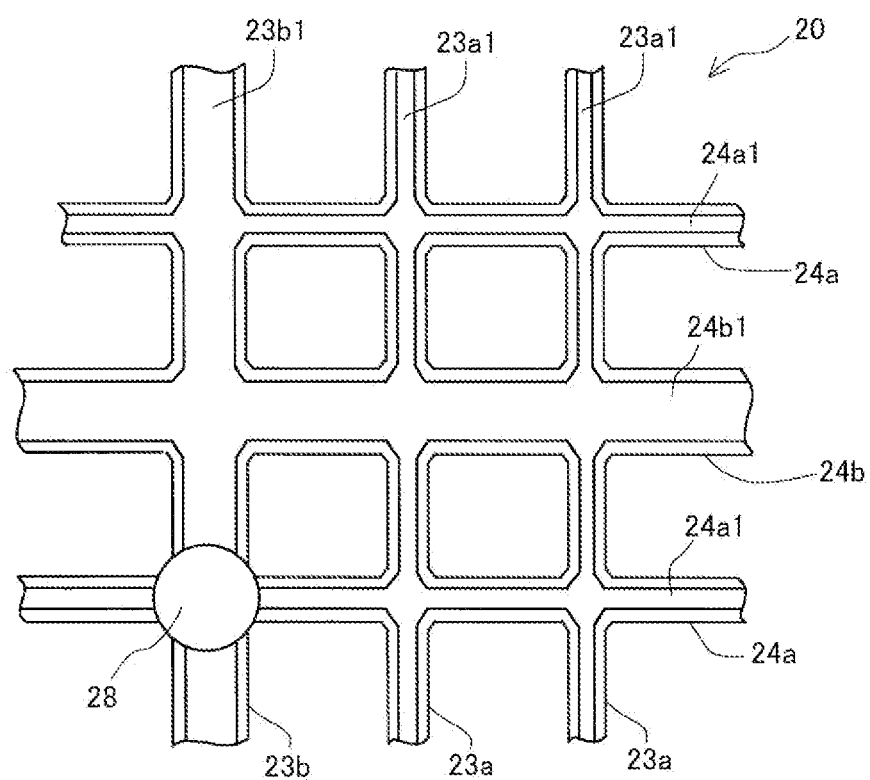
FIG. 4 is an enlarged front view of a portion of the grid plate of FIG. 1.

FIG. 1 shows an example of the grid plate 20 used in the lead acid storage battery according to the present embodiment. The grid plate 20 in the diagram is provided with a frame section 21 having a rectangular profile shape, and a grid 22 formed inside the frame section 21. FIG. 1 shows the shape of the main plane of one end side of the grid plate 20 in the thickness direction, but in the drawing, the detailed parts of the shape of the main plane are omitted. As described below, the ridge line of each strand actually appears on the main plane of the grid plate as shown in the enlarged view of FIG. 4 because the strands have a hexagonal cross-sectional shape. The parts of the grid plate are described in detail below.

[Frame Section]

The frame section 21 outlines the external shape of the grid plate. The shape of the frame section 21 is a shape that matches the internal shape of the container (the outer case) of the lead acid storage battery that is ultimately used. In the case that a container having the shape of a cuboid or rectangular parallelepiped is used, the profile shape of the frame section 21 can be a square shape or a rectangular shape.

The frame section 21 in the drawing has a pair of lateral frame strands 21a, 21a that extend in the lateral direction and that are in an opposing arrangement in the longitudinal direction, and a pair of longitudinal frame strands 21b, 21b that extend in the longitudinal direction and that are in an opposing arrangement in the lateral direction. A plate lug section 25 for connecting straps (not shown) is integrally formed in one of the lateral frame strands 21a of the frame section 21.

Integrally formed with the frame section in the other lateral frame strand 21a of the frame section 21 are a holder lug section 26 that protrudes to the opposite side of the plate lug section 25, and a leg section 27 that protrudes in the same direction as the holder lug section 26 from a location set at a distance in the lateral direction from the holder lug section 26. The plate lug section 25 and the holder lug section 26 are symmetrically disposed and are used for holding the grid plate on a conveyance tool when a series of grid plates 20 is arranged and conveyed in a downwardly suspended state with the plate surfaces (main planes) facing the lateral direction in the step for manufacturing plates. In the step for manufacturing plates, the plate lug section 25 and the holder lug section 26 are hooked by the transport tool and the grid plates are thereby held in a suspended state. The holder lug section 26 is cut so as to constitute a leg section that is the same shape as the leg section 27 after packing of the active material into the grid plate has been completed. The leg section 27 and the leg section formed by cutting the holder lug section 26 are used for forming a gap between the bottom surface of the cell chamber and the lower end of the frame section 21 when the plate group is inserted into the cell chamber of the container. There are cases in which the leg section 27 is omitted, but in such a case, the entire holder lug section 26 is cut off after packing of the active material into the grid plate has been completed.

A plate lug section 25 for a strap that connects the plates of a plate group of the same polarity. The plate lug section 25 is preferably formed to a suitable shape and size in accordance with the shape of the container and the lid, and the shape of the plate. The number of plate lug sections 25 is preferably one, and the thickness is preferably about the same thickness as that of the frame section. The plate lug section is preferably formed from the same materials as the frame and grid sections in order to facilitate manufacture.

As described above, in the present embodiment, the portion on which the plate lug section 25 of the grid plate 20 is disposed is the upper portion of the grid plate, and the direction in which the longitudinal frame strand 21b (the lengthwise direction of the longitudinal frame strands) extends is the longitudinal direction of the grid plate 20. The direction in which the lateral frame strand 21a extends is the lateral direction, and the direction perpendicular to the longitudinal direction and lateral direction of the grid plate 20 is the thickness direction of the grid plate. The longitudinal, lateral, and thickness directions of the plate are directions along the longitudinal, lateral, and thickness directions, respectively, of the grid plate 20. In relation to the longitudinal frame strands, lateral frame strands, longitudinal grid strands, and lateral grid strands, the direction along the thickness direction of the grid plate is the thickness direction, and the direction perpendicular to the lengthwise and thickness directions is the width direction. Furthermore, the surface of the grid plate facing upward and the surface facing downward are referred to as the top surface and the reverse surface, respectively, of the grid plate when the grid plate is laid down on a lateral plane and the active material is to be packed into the grid plate.

Figure 2:
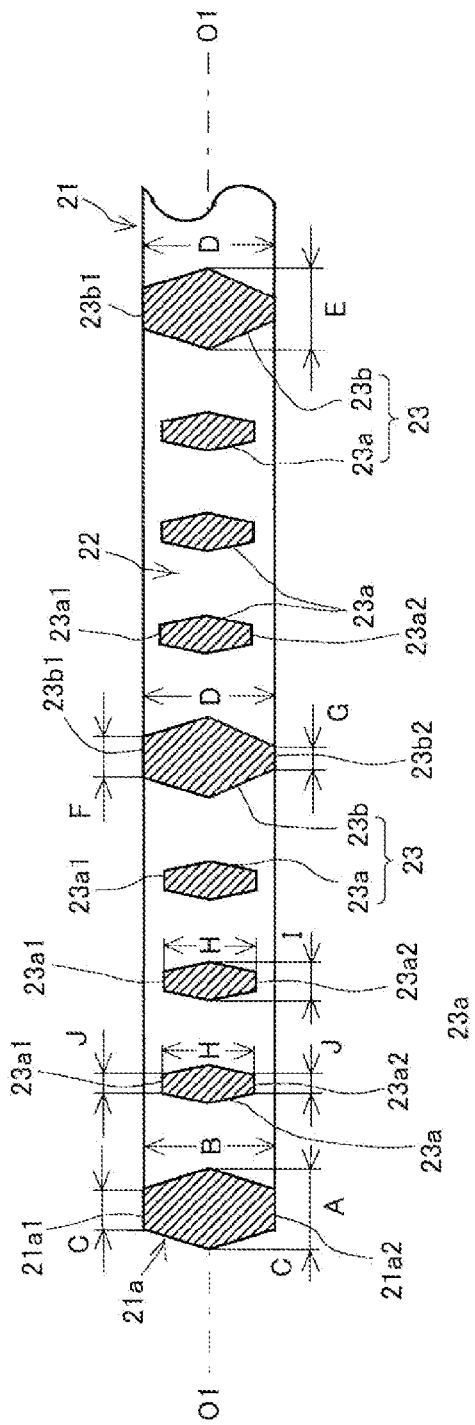
FIG. 2 is an enlarged cross-sectional view showing a cross section of the grid plate of FIG. 1 along the line II-II.
Figure 3:
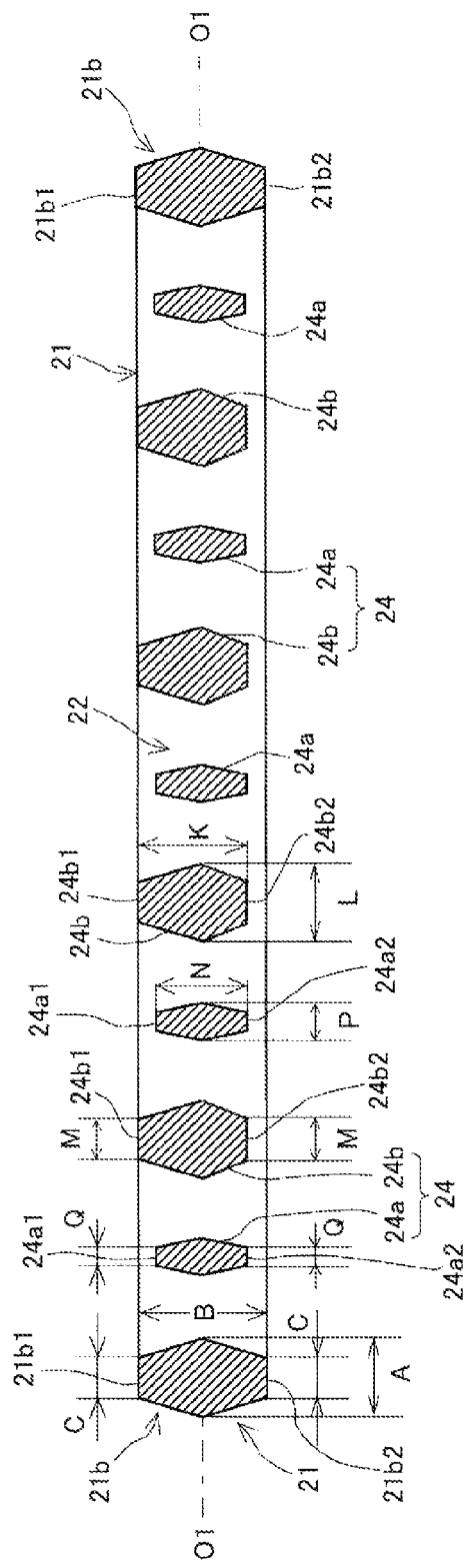
FIG. 3 is an enlarged cross-sectional view showing a cross section of the grid plate of FIG. 1 along the line III-III.

The cross-sectional shape of the lateral frame strand 21a and longitudinal frame strand 21b is preferably one in which the contact surface area with the active material is high and the active material is readily packed. In the present embodiment, the profile of the cross-section of the lateral frame strand 21a and longitudinal frame strand 21b presents a hexagonal shape thinly extended in the thickness direction of the frame section, as shown in FIGS. 2 and 3. In the present embodiment, two opposing sides of the six sides of the hexagon that forms the profile of the cross section of the lateral frame strand 21a and longitudinal frame strand 21b are in an opposing arrangement in the thickness direction of the frame section 21, and the orientation of the hexagon that forms the profile of the cross section of the lateral frame strand 21a and longitudinal frame strand 21b is set so that two opposing apexes in the direction perpendicular to the direction in which these two side are in opposition are positioned on a reference plane O1-O1 that is set so as to form a right angle with respect to the thickness direction of the frame section.

In the example in the drawings, the profile shape of the cross-sectional surface of the lateral frame strand 21a (FIG. 2) and the longitudinal frame strand 21b (FIG. 3) is a hexagonal shape thinly extended in the thickness direction of the frame section 21. Therefore, the width dimension A of the lateral frame strand 21a and the longitudinal frame strand 21b is set to be less than the thickness dimension B. Flat end faces 21a1, 21a2, and 21b1, 21b2 are formed on the two ends of the lateral frame strand 21a and longitudinal frame strand 21b, respectively, in the thickness direction. In the present embodiment, the width dimension C of the end faces 21a1, 21a2, and 21b1, 21b of the lateral frame strand 21a and longitudinal frame strand 21b, respectively, are all set to be equal to each other.

[Grid]

The grid 22 is composed of a plurality of lateral grid strands 23, 23, . . . , and a plurality of longitudinal grid strands 24, 24, . . . . The material of the lateral grid strands and the longitudinal grid strands may be the same as or different from the lateral frame strands and longitudinal frame strands described above, but the material constituting the longitudinal grid strands and lateral grid strands is preferably the same material constituting the lateral frame strands and longitudinal frame strands so that the lateral frame strands, longitudinal frame strands, lateral grid strands, and longitudinal grid strands can be integrally formed in a simple single process.

The plurality of lateral grid strands 23, 23, . . . are disposed parallel to the lateral frame strand 21a and are arranged in alignment at fixed intervals in the lengthwise direction of the longitudinal frame strand 21b. The plurality of longitudinal grid strands 24, 24, . . . are disposed so as to extend parallel to the longitudinal frame strand 21b and are arranged in alignment at fixed intervals in the lengthwise direction of the lateral frame strand 21a. The grid 22 is composed of lateral grid strands 23, 23, . . . and longitudinal grid strands 24, 24, . . . that intersect each other at right angles. In the example depicted in the drawings, 26 lateral grid strands 23, 23, . . . are provided, and nine longitudinal grid strands 24, 24, . . . are provided.

The lateral grid strands 23 are composed of a plurality of thin strands 23a having a cross-sectional area that can withstand corrosion over the service life period of the lead acid storage battery, and the plurality of thick strands 23b having a larger cross-sectional area than the thin strands 23a. The thick strands 23b and thin strands 23a are arrayed so that the strands adjacent to the thick strands 23b are thin strands 23a. In the drawing, 21 thin strands 23a are provided and five thick strands 23b are provided.

Similarly, the longitudinal grid strands 24 are composed of a plurality of thin strands 24a having a cross-sectional area that can withstand corrosion over the service life period of the lead acid storage battery, and the plurality of thick strands 24b having a larger cross-sectional area than the thin strands 24a. The thick strands 24b and thin strands 24a are arrayed so that the strands adjacent to the thick strands 24b are thin strands 24a. In the drawing, five thin strands 24a are provided and four thick strands 24b are provided.

In the present embodiment, the thin strands 23a and thick strands 23b constituting the lateral grid strands 23 are referred to as thin lateral strands and thick lateral strands, respectively, and the thin strands 24a and thick strands 24b constituting the longitudinal grid strands 24 are referred to as thin longitudinal strands and thick longitudinal strands, respectively, in order to differentiate between the thin strands 23a and thick strands 23b constituting the lateral grid strands 23 and the thin strands 24a and thick strands 24b constituting the longitudinal grid strands 24.

In the present embodiment, the thin lateral strands 23a and the thick lateral strands 23b constituting the grid 22 are formed so as to have a longitudinally long hexagonal cross-sectional shape in the thickness direction of the grid plate, as shown in FIG. 2. In the same manner as the frame strand section, two opposing sides of the six sides of the hexagon that forms the profile of the cross-section of the thin lateral strands 23a and thick lateral strands 23b are in an opposing arrangement in the thickness direction of the frame section 21, and the cross-sectional shapes of the thin lateral strands 23a and thick lateral strands 23b are set so that two opposing apexes in the direction perpendicular to the direction in which these two sides are in opposition are positioned on a reference plane O1-O1 that is set so as to form a right angle with respect to the thickness direction of the frame section. The reference plane O1-O1 is a plane that follows the separation surface of the mold used for die casting the grid plate.

The thick lateral strands 23b have a thickness D (=B) that is equal to the thickness B of the frame section 21, and are provided so that the end faces 23b1 of one end side and the end faces 23b2 of the other end side in the thickness direction are positioned in the same plane as the end faces 21a1 of one end side and the end faces 21a2 of the other end side of the frame section 21 in the thickness direction, as shown in FIG. 2. The width E of the thick lateral strands 23b is set to be less than the thickness D thereof in order to give the cross-sectional profile shape of the thick lateral strands 23b a hexagonal shape that is extended in the thickness direction. In the present invention, the width dimension G of the end faces 23b2 of the other end side of the thick lateral strands 23b in the thickness direction is set to be less than the width dimension F of the end faces of the one end side of the thickness lateral strands in the thickness direction. In the present embodiment, the width dimension G of the end faces 23b2 of the other end side of the thick lateral strands 23b in the thickness direction is set so as to be sufficiently small so that the end faces 23b2 can be completely covered with active material by the flow of active material produced in the active material compression step to be carried out thereafter, even in the case that the end faces 23b2 of the other end side of the thick lateral strands in the thickness direction are exposed and not covered by the active material at the point at which the packing of the active material has been completed.

The thin lateral strands 23a have a thickness H that is less than the thickness D (=B) of the thick lateral strands 23b and a width I that is less than the width E of the thick lateral strands 23b, and are arranged so that the end faces 23a1 of one end side and the end faces 23a2 of the other end side in the thickness direction are positioned further inward from the frame section in the thickness direction (positioned further inward from the frame section 21 in the thickness direction) than the end faces 21a1 of one end side and the end faces 21a2 of the other end side of the lateral frame strand 21a in the thickness direction. Therefore, the width I of the thin lateral strands 23a is set to be less than the thickness H in order to give the cross-sectional profile shape of the thin lateral strands 23a a hexagonal shape that is extended in the thickness direction. The width dimension of the end faces 23a1 of one end side and the end 23ac faces of the other end side of the thin lateral strands 23a in the thickness direction can be suitably set, but in the present embodiment, the end faces 23a1 of one end side and the end faces 23a2 of the other end side of the thin lateral strands 23a in the thickness direction have an equal width dimension J.

The plurality of thick longitudinal strands 24b constituting the longitudinal grid strands 24 has a thickness K (<B) that is less than the thickness B of the frame section 21, as shown in FIG. 3; and is arranged so that the end faces 24b1 of one end side in the thickness direction are positioned in the same plane as the end faces of one end side of the frame section 21 in the thickness direction, and so that the end faces 24b2 of other end side in the thickness direction are positioned further inward from the frame section in the thickness direction than are the end faces of the other end side of the frame section 21 in the thickness direction. The width L of the thick longitudinal strands 24b is set to be less than the thickness K in order to give the cross-sectional profile shape of the thick longitudinal strands 24a a hexagonal shape that is extended in the thickness direction. The width dimension of the end faces 24b1 of one end side and the end faces 24b2 of the other end side of the thick longitudinal strands 24b in the thickness direction can be suitably set, but in the present embodiment, the end faces have an equal width dimension M.

The thin longitudinal strands 24a constituting the longitudinal grid strands have a thickness N that is less than the thickness K (<B) of the thick longitudinal strands 24b and a width P that is less than the width L of the thick longitudinal strands 24b, and are arranged so that the end faces 24a1 of one end side and the end faces 24a2 of the other end side in the thickness direction are positioned further inward from the frame section in the thickness direction than are the end faces 21b1 of one end side and the end faces 21b2 of the other end side of the longitudinal frame strand 21b in the thickness direction. The width P of the thin longitudinal strands 24a is set to be less than the thickness N in order to give the cross-sectional profile shape of the thin longitudinal strands 24a a hexagonal shape that is extended in the thickness direction. The width dimension of the end faces 24a1 of one end side and the end faces 24a2 of the other end side of the thin longitudinal strands 24a in the thickness direction can be suitably set, but in the present embodiment, the end faces 24a1 of one end side and the end faces 24a2 of the other end side of the thin longitudinal strands 24a in the thickness direction have an equal width dimension Q. Also, in the present embodiment, the thickness N of the thin longitudinal strands 24a is set equal to the thickness H of the thin lateral strands, and the width P of the thin longitudinal strands 24a is set equal to the width I of the thin lateral strands 23a. The width Q of the end faces of one end side and the other end side of the thin longitudinal strands 24a in the thickness direction are set equal to the width J of the end faces of one end side and the other end side of the thin lateral strands 23a in the thickness direction.

In the present embodiment, the thick strands and thin strands are arrayed so that the strands adjacent to the thick strands are thin strands, but it is not necessarily required that the size (thickness and width) of the thin strands constituting the lateral grid strands and the longitudinal grid strands be a uniform size, and it is also possible to provide a plurality of types of thin strands that differ in width and thickness. The thin strands arranged between the frame section and the thick strands, and between the thick strands and the thick strands may be a single strand or a plurality of strands.

[Relationship Between the Size of the Thin Strands and the Size of the Thick Strands]

The size (cross-sectional area) of the thick lateral strands 23b and the thick longitudinal strands 24b may be the same or different. The size of the thick lateral strands and the size of the thick longitudinal strands may be made different with consideration given to the casting characteristics of the grid plate. For example, when the size of the thick lateral strands is made to be greater than the size of the longitudinal thick strands, and the grid plate is die-cast using gravity die casting in a state in which the cavity for die casting the lateral grid strands is oriented facing the longitudinal direction in the mold for die casting the grid plate, a large amount of molten lead can be made to smoothly flow through the interior of the cavity (a cavity that extends in the longitudinal direction) having a large cross-sectional area for die casting the thick lateral strands 23b. Therefore, the flow of the molten metal into the cavity for die casting the longitudinal grid strands can be smoothly carried out and die casting can be facilitated.

The relationship between the size of the thick lateral strands 23b and the size of the thin lateral strands 23a, and the relationship between the size of the thick longitudinal strands 24b and the thin longitudinal strands 24a are suitably set with consideration given to the ease of packing the active material, the service life of the plate, and the like.

[Grid Strand Array]

In the present embodiment, the thin longitudinal strands 24a and thick longitudinal strands 24b constituting the longitudinal grid strands 24 are provided so that the thick longitudinal strands 24b and the thin longitudinal strands 24a are aligned in an alternating fashion in the lengthwise direction of the lateral frame strand 21a, as shown in FIG. 1.

In the grid 22, the electric resistance increases with increasing the distance from the plate lug section 25, and the loss of voltage generated by the grid strands increases with increasing the distance from the plate lug section 25. Accordingly, the current that flows between the active material and the grid strands in locations far from the plate lug section 25 is limited, and active charge and discharge reactions of the active material in locations far from the plate lug section 25 are less likely. In order to prevent such a state from occurring, it is preferred that the grid strands be arranged so that the ratio of the number of thin lateral strands disposed in a fixed unit area in relation to the number of thick lateral strands in a region near the other of the lateral frame strands set at a distance from the plate lug section 25 is less than the ratio of the thin lateral strands in a fixed unit area in relation to the number of thick lateral strands in a region adjacent to the one lateral frame strand 21a to which the plate lug section 25 is provided.

Accordingly, in the present embodiment, two regions are provided; i.e., a first region A1 in which the ratio of the number of thin lateral strands to thick lateral strands is a first ratio in one lateral frame strand 21a side on which the plate lug section 25 is disposed and in the other lateral frame strand 21a side in a position set at a distance from the plate lug section; and a second region A2 in which the ratio of the number of thin lateral strands to the number of thick lateral strands is a second ratio that is less than the first ratio.

The ratio of the number of thin lateral strands to the number of thick lateral strands in the first region A1 and second region A2 is not particularly limited, but in the present embodiment, the ratio of the number of thick lateral strands and the number of thin lateral strands is set so that four thin lateral strands are aligned adjacent to a single thick lateral strand in the first region A1; and that three thin lateral strands are aligned adjacent to a single thick lateral strand in the second region A2. In other words, the distance between the thick lateral strands 23b in the second region A2 is less than the distance between the thick lateral strands 23b in the first region A1. When the thick lateral strands and thin lateral strands are provided in such a ratio, the active material paste can be readily packed into the grid plate while the electrical resistance of the grid (drop in voltage) increases with increasing the distance from the plate lug section.

[Dimensions of the Frame Section of the Grid Plate]

The thickness of the frame section 21 is determined by experimentation with consideration given to the following points. When the thickness of the frame section 21 is excessively low, the thickness of the thick strands set to be less than the thickness of the frame section becomes excessively low, the period of time until corrosion of the grid strands reaches allowable limit is reduced, and the service life of the plate tends to be shortened. Also, when the thickness of the frame section becomes excessively low, the ability to hold the active material may be reduced because the thickness of the thin strands becomes excessively low. When the thickness of the thick lateral strands 23b constituting the grid strands is made to be equal to thickness of the frame section 21, and the thickness of the thin lateral strands 23a and the thickness of the thick lateral strands 24b and thin lateral strands 24a can be set to a suitable value in a range of 5 mm or less, it is possible to address the need for extending the service life of the plate and the need for increasing the ease of packing the active material without reducing the ability to hold the active material.

The frame section 21 is preferably formed in a rectangular shape of approximately the same size as the frame section of a grid plate used in current industrial lead acid storage batteries, e.g., a rectangular shape having a lengthwise dimension of 370 to 390 mm and a crosswise dimension of 130 to 150 m.

When the above-described values are taken as the dimensions of the frame section for a grid plate, a relatively large plate can be fabricated, and a battery with a large discharge capacity can be fabricated by using a large number of the plates. The above-described dimensions of a grid plate are about the same as the dimensions of a grid plate used in industrial lead acid storage batteries. Therefore, the container, lid, and the like of a conventional industrial lead acid storage battery can be used without modification, the discharge capacity can be increased, and a lead acid storage battery having a long service life can be obtained.

[Dimensions of the Thick Lateral Strands and the Thick Longitudinal Strands]

In the present invention, the thick lateral strand 23b and thick longitudinal strand 24b portion can be provided with a function for keeping the shape of the grid in predetermined shape over the service life period of the battery. Therefore, the number of thick lateral strands 23b and thick longitudinal strands 24b is set to the required number of strands when the grid plate of the present invention is manufactured in order to maintain the shape of the grid for a desired service life period. The number of thick lateral strands 23b and thick longitudinal strands 24b is set so as not to be excessive, so as not to cause any reduction in the amount of active material that can be packed into the grid plate 20. Similarly, the cross-sectional area of the thick lateral strands 23b and thick longitudinal strands 24b is set to the minimum size necessary (so as not to be excessively great) so that there will be no reduction in the amount of active material that can be packed into the grid plate and so that the shape of the grid body will be preserved over a desired service life period. The cross-sectional area and number of the thick lateral strands and the thick longitudinal strands are determined by experimentation.

[Dimensions of the Thin Lateral Strands and the Thin Longitudinal Strands]

The thin lateral strands 23a and the thin longitudinal strands 24a are formed so as to have a cross-sectional area (a smaller cross-sectional area than the cross-sectional area of the thick lateral strands and thick longitudinal strands) that is suitable for holding a predetermined shape for a desired service life period, and for maintaining the function of holding the active material, under the assumption of reliance on the strength of the thick lateral strands 23b and thick longitudinal strands 24b. The width of the thin lateral strands 23a and thin longitudinal strands 24a is set to a value that can ensure space for facilitating the flow of active material paste between the thick lateral strands 23b and thick longitudinal strands 23a and between the thick longitudinal strands 24b and the thin longitudinal strands 24a.

When the width of the thin lateral strands 23a and thin longitudinal strands 24a is excessive, the amount of active material that can be packed into the grid plate is reduced and it then becomes impossible to achieve the effects of the present invention, namely: to facilitate the flow of active material when the active material is packed into the grid plate, to make the active material easy to be packed, and to prevent a state in which a portion of the grid body is not covered with active material. When the cross-sectional area of the thin lateral strands and thin longitudinal strands is excessively low, corrosion of the thin lateral strands and thin longitudinal strands prematurely reaches into deep parts and the mechanical strength is reduced. Therefore, the shape of the thin lateral strands and thin longitudinal strands cannot be maintained even with reliance on the thick lateral strands and the thick longitudinal strands, and the function for holding the active material is diminished. The cross-sectional area of the thin lateral strands 23a and the thin longitudinal strands 24a are determined by experimentation.

[Die-Casting the Grid Plate]

A grid plate may be manufactured using gravity die casting (GDC), continuous casting, expanding, punching, or the like, but the grid plate of the present invention is preferably manufactured by gravity die casting. Gravity die casting is a die casting method in which a starting material metal (alloy) for forming a grid plate is melted, the molten metal (alloy) is poured and cast by gravity into a metal mold composed of a material that can withstand the temperature of the molten metal. The reason that gravity die casting is preferred is that with gravity die casting, there is no theoretical upper limit to the thickness of the grid that can be cast, a grid having thick grid strands and thin grid strands is readily manufactured, and the resulting collection characteristics and corrosion resistance are excellent.

Figure 5:
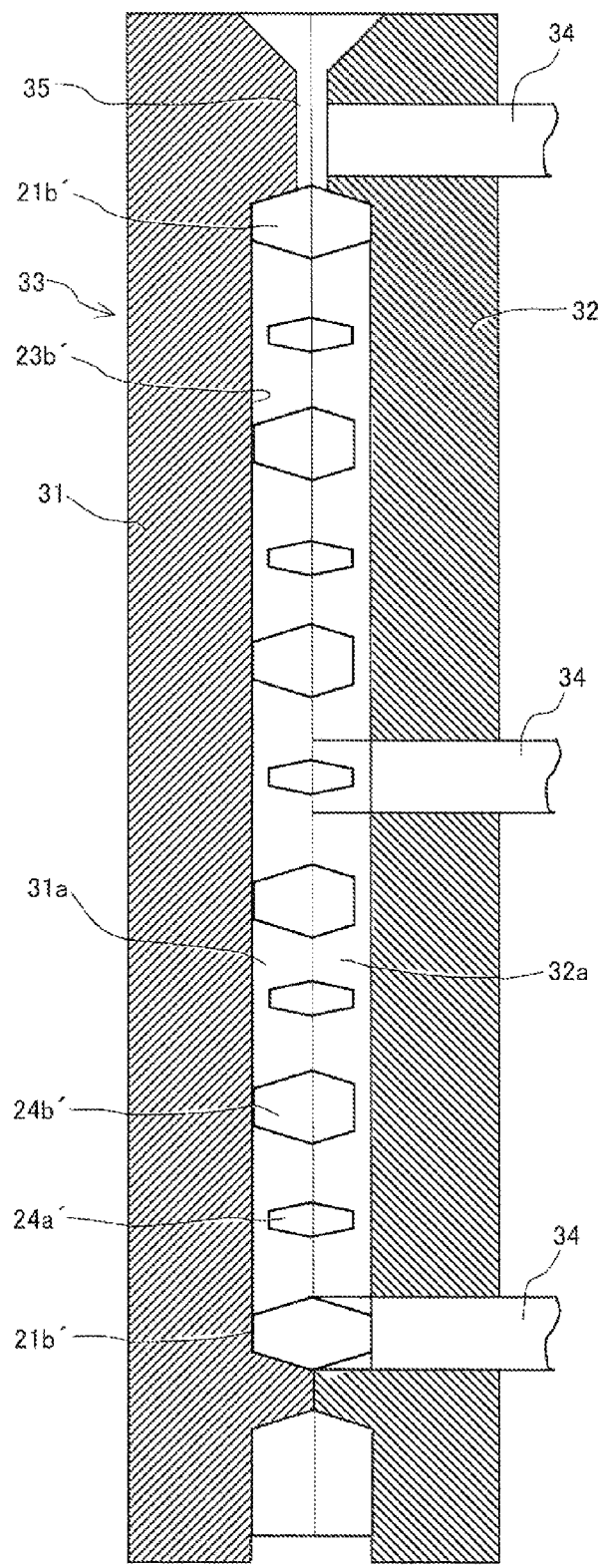
FIG. 5 is a cross-sectional view showing an example of the configuration of the mold used for die casting the grid plate of FIG. 1.

When the grid plate is die cast by gravity die casting, there is used a mold 33 comprising a first mold 31 having a cavity 31a for molding one half of the grid plate in the thickness direction and a second mold 32 having a cavity 32a for molding the other half of the grid body in the thickness direction, as shown in FIG. 5. An ejector pin 34 used for releasing the die-cast grid body is provided to the second mold 32. In a state in which the first mold and second have been brought together, a cavity for molding the parts of the grid plate is formed inside the mold. In FIG. 5, the reference numeral 23b' is a cavity for die casting the thick lateral strand 23b; 24a' and 24b' are cavities for die casting the thin longitudinal strands 24a and thick longitudinal strands 24b, respectively, and 21b' is a cavity for die casting the longitudinal frame strand 21b.

When a grid plate is molded using this mold, the first mold 31 and the second mold 32 are brought together, molten lead acid alloy (molten metal) is injected into the mold via a gate 35 formed along the matching surfaces of the two molds in a state in which the lengthwise direction of the cavity 23b' for molding thick lateral strands formed in the mold is oriented in the longitudinal direction, as shown in FIG. 5, and the molten metal is allowed to flow by gravity into each part in the mold. After the lead alloy thus injected into the mold has cooled and solidified, the first mold 31 is separated from the second mold 32, and the grid plate remaining in the second mold 32 side is pushed out by the ejector pin 34 and released from the second mold 32. In FIG. 5, the ejector pin 34 shown in the uppermost portion used for pushing out the lead alloy thus solidified inside the gate 35 of the mold.

In the present embodiment, an ejector pin contact seat 28 is provided to the grid plate 20 so as to make contact with the ejector pin 4 when the die-casted grid plate is ejected from the mold. The ejector pin contact seat 28 is preferably provided to the intersecting part between the frame section and the lateral grid strands or the longitudinal grid strands, and the intersecting part between the lateral grid strands and the longitudinal grid strands, so as to have a larger cross-sectional area than the cross-sectional area of the intersecting parts in order to avoid having the force applied by the ejector pin be concentrated on a single point and deform the grid plate when the die-casted grid plate is pushed out by the ejector pin.

In the example shown in FIG. 1, ejector pin contact seats 28 are formed at the intersecting parts between one of the longitudinal frame strands 21b and the five thick lateral strands 23b; at the intersecting parts between one of the longitudinal frame strands 21b and the thin lateral strands 23a, 23a provided near one end and near the other end in the longitudinal direction; at the intersecting parts between one of the thin longitudinal strands 24a arranged in the center of the grid plate in the lateral direction and the five thick lateral strands 23b; and at the intersecting parts between one of the thin longitudinal strands 24a arranged in the center of the grid plate in the lateral direction and two lateral frame strand 21a, 21a. The ejector pin contact seats 28 are formed so as to have a cross-sectional area that is greater than the cross-sectional area of the intersecting part between the longitudinal frame strand 21b and the thick lateral strands 23b or the thin lateral strands 23a; the intersecting part between the lateral frame strand 21a and the thin longitudinal strands 24a; and the intersecting part between the thick lateral strands 23b and the thin longitudinal strands 24a.

Figure 6:
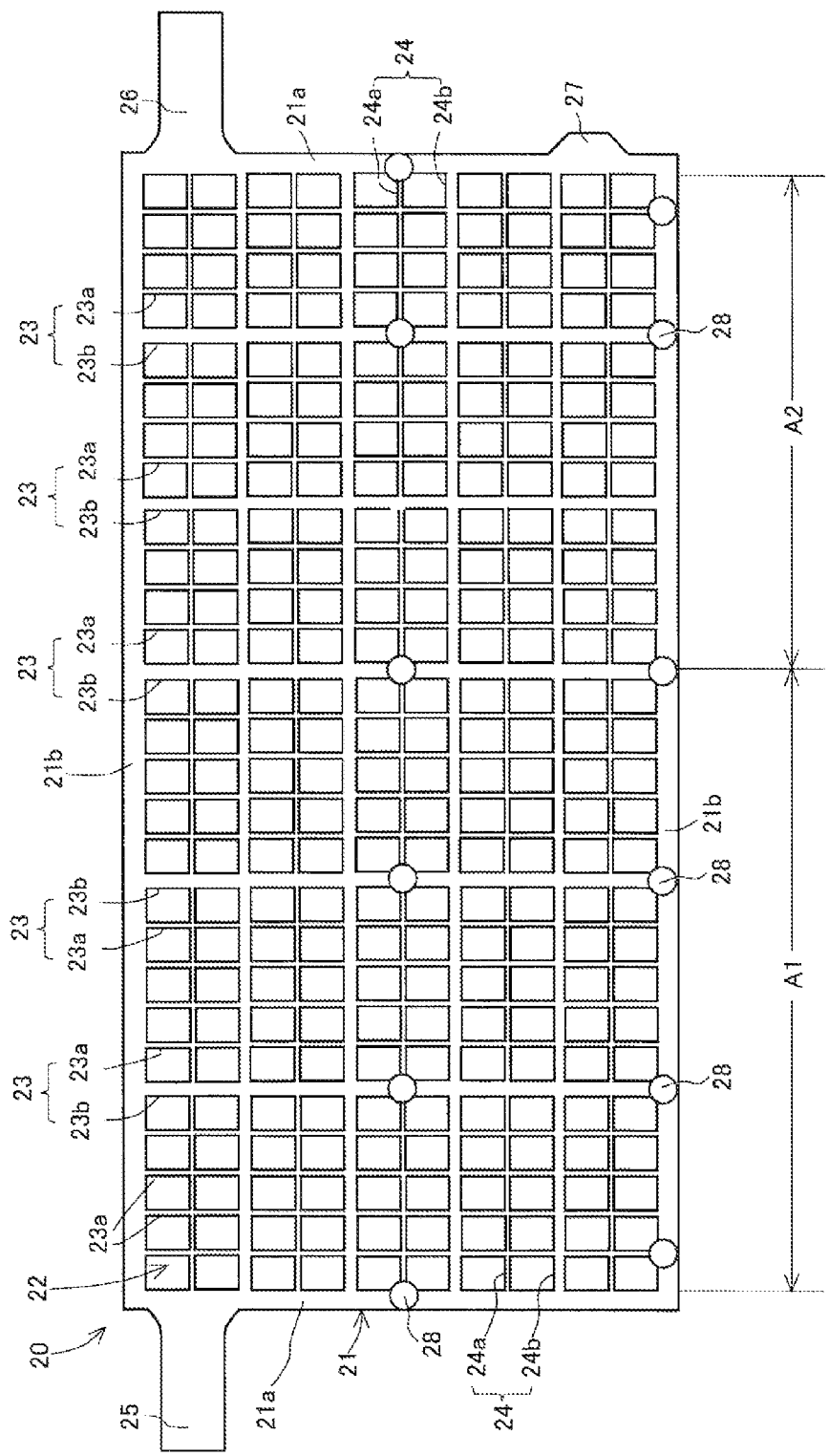
FIG. 6 is a front view showing another example of the grid plate used in the lead acid storage battery according to the present invention.
Figure 7:
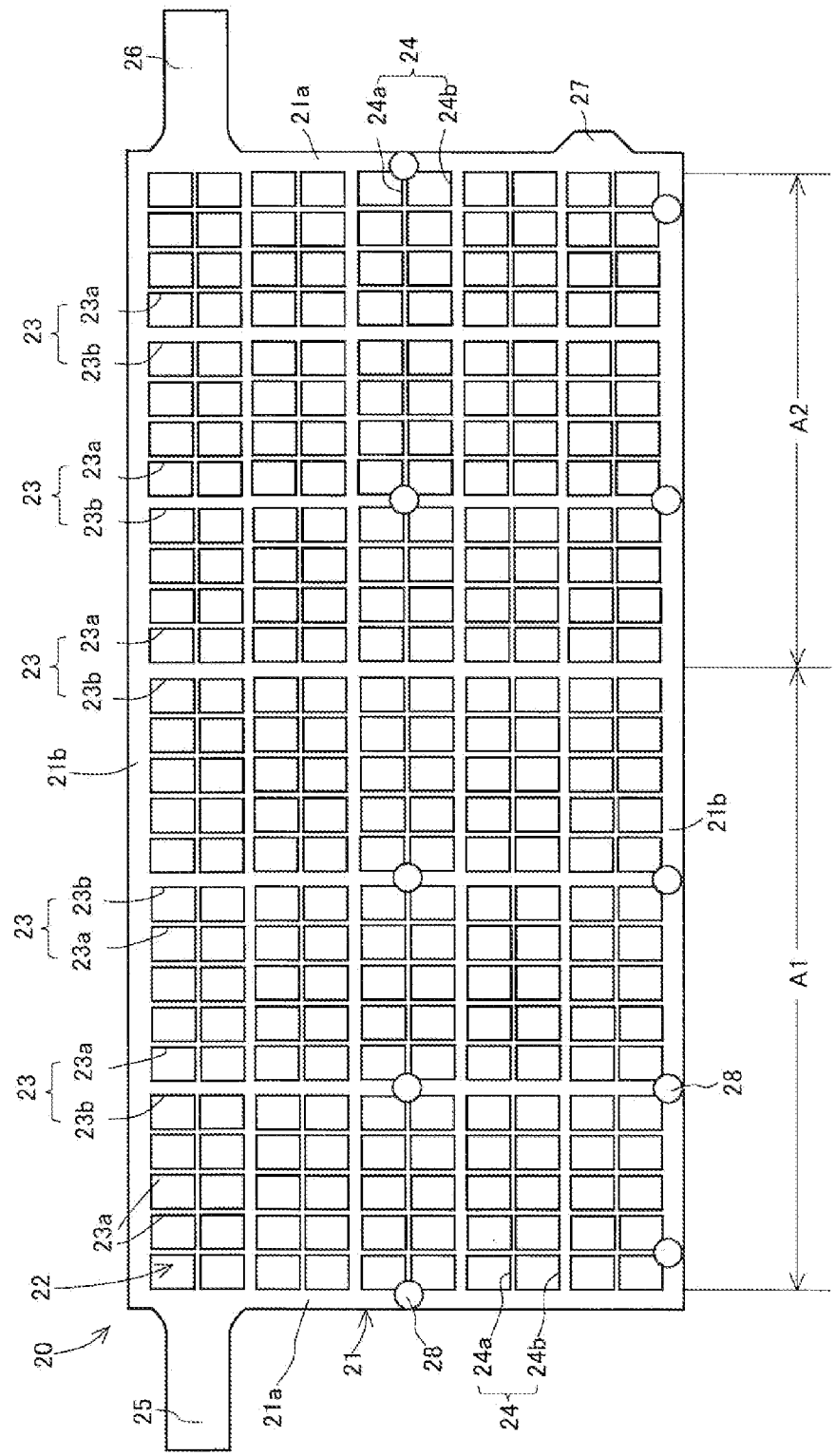
FIG. 7 is a front view showing yet another example of the grid plate used in the lead acid storage battery according to the present invention.

The array of the ejector pin contact seat 28 is not limited to the example shown in FIG. 1. For example, the ejector pin contact seats 28 may be arrayed as shown in FIG. 6 or 7.

[Manufacture of the Plate]

Figure 8:
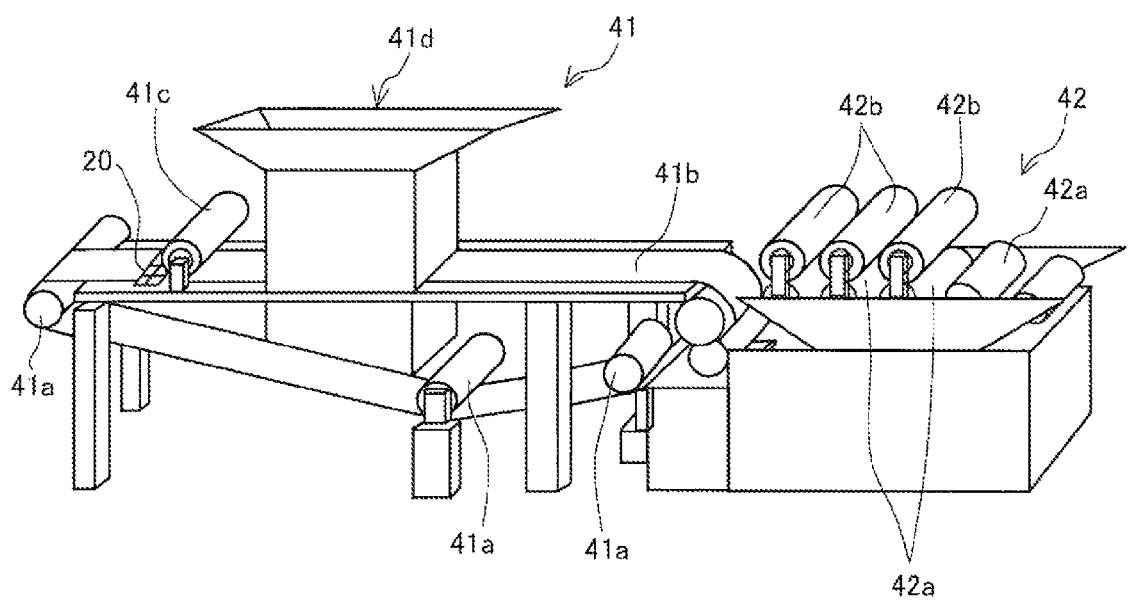
FIG. 8 is a perspective view showing a configuration of the device that is used when the active material is packed into the grid plate.

The active material packing step and active material compression step are carried out when the plate for a lead acid storage battery is manufactured using the grid plate 20. An example of a paste packing machine 41 used in the active material packing step and an example of a compression machine 42 used in the active material compression step are shown in FIG. 8. The paste packing machine 41 in the drawing is composed of a conveyor belt 41b that is guided by a roller 41a and that travels in a single direction; a feed roller 41c that is in contact from above with the grid plate 20 disposed on the conveyor belt 41b and that rotates while pressing the grid plate 20 to the conveyor belt 41b side; and a paste feed device 41d for feeding and pressing the active material paste to the grid plate 20 on the conveyor belt 41b. The conveyor belt 41b and the feed roller 41c are driven by a motor (not shown).

The compression machine 42 is provided with a plurality of feed rollers 42a whose axes are aligned and arranged facing the direction perpendicular to the conveyance direction, and pressure rollers 42b urged to the feed rollers 42a side by an air cylinder, a spring, or the like. The active material packed into the grid plate is compressed and compacted in the thickness direction of the grid plate while the plate fed from the paste packing machine 41 side is sent forward in a state held between the feed rollers 42a and the pressure rollers 42b.

The grid plate 20 die-cast in the die-casting step is conveyed by the conveyance device (not shown) and is fed to the end portion of the conveyor belt 41b. The grid plate 20 is fed onto the conveyor belt 41b in a state in which the lateral direction of the grid plate faces the conveyance direction, the longitudinal direction of the grid plate faces the direction perpendicular to the conveyance direction, and the one of the main planes (top surface) in the thickness direction of the grid plate is faced upward. The grid plate 20 fed onto the conveyor belt 41b is sent into the paste feed device 41d while held between the feed rollers 41c and the conveyor belt 41b.

The paste feed device 41d feeds the active material paste to the top surface of the grid plate 20 at a predetermined pressure. The active material fed to the top surface of the grid plate 20 covers the top surface of the grid plate 20, passes through the grid 22 openings, flows to the reverse surface side of the grid plate, and is packed into the openings of the grid 22 and the reverse surface side of the grid plate.

The active material packed into the grid plate is not particularly limited, but is preferably fabricated by kneading together water, sulfuric acid, a lead powder containing lead monoxide, and the like. Cut fiber, carbon powder, lignin, barium sulfate, red lead, and other additives may also be added to the active material in accordance with the characteristics of the positive and negative electrodes. The amount of active material to be packed is not particularly limited as long as the strands (thick and thin strands) formed inside the frame strands are completely hidden, but the active material is preferably packed to the thickness of the frame strands or greater.

The grid plate packed with active material (namely plates) is conveyed by the conveyor belt 41b and fed to the compression machine 42. The plate fed to the compression machine 42 is fed while being pressed between the feed rollers 42a and the pressure rollers 42b. In this process, the active material is compressed and compacted in the thickness direction of the grid plate.

The plate according to the present invention is fabricated by packing the above-described paste-form active material into the grid plate using a paste packing machine, and then aging and drying the assembly. The time and temperature of the aging and drying are not particularly limited, but are preferably adjusted to suitable values in accordance with the thickness of the grid plate and the physical properties of the active material.

[Configuration of the Lead Acid Storage Battery]

The configuration of the lead acid storage battery according to the present invention is not particularly limited as long as at least the grid plate according to the present invention is used as the positive plate. As described above, the lead acid storage battery is fabricated from a positive plate, a negative plate, dilute sulfuric acid as the electrolyte, a separator (a retainer or the like made of glass fiber), a container, a lid, and the like. For example, the positive plate 1 and the negative plate 2 are layered in alternating fashion with separators disposed between the positive plates 1 and the negative plates 2, as shown in FIG. 9. The plate lug sections of the same polarity plate are linked together with straps 5, 6 to form a plate group 4. The plate group 4 is placed in a container 7 and sealed with lid. Dilute sulfuric acid is poured and then subjected to formation to complete the lead acid storage battery.

When the grid plate 20 is configured in the manner of the present embodiment, the end faces of one end side of the thick lateral strands 23b in the thickness direction and the end faces of one end side of the thick longitudinal strands 24b in the thickness direction can be positioned in the same plane as the end faces of one end side of the frame section 21 in the thickness direction. Therefore, sufficient contact surface area can be obtained between the feed rollers 41c and the grid plate 20 and frictional resistance between the feed rollers 41c and the grid plate 20 can be increased when the grid plate 20 is fed by the feed rollers 41c into the paste packing machine. Also, in the grid plate of the present embodiment, it is possible to increase the contact surface area between the grid plate 20 and the conveyor belt, and to increase the frictional resistance between the two because the other end of the thick lateral strands 23b in the thickness direction can be positioned in the same plane as the end faces of the other end side of the frame section 21 in the thickness direction. Therefore, the grid plate can be reliably fed into the paste packing machine 41 and the operation for packing active material into the grid plate can be smoothly carried out in a state in which the frictional resistance between the grid plate and the feed rollers and between the grid plate and the conveyor belt has been sufficiently increased, and the grid plate is kept the proper orientation in which the lateral direction of the grid plate faces the conveyance direction when the grid plate is held between the conveyor belt and the feed rollers and fed to the paste packing machine.

In the present embodiment, the end faces of the thick lateral strands 23b and the thick longitudinal strands 24b in the thickness direction and the end faces of one end side of the frame section 21 in the thickness direction are arranged in the same plane on the top surface (the surface facing upward when the active material is being packed) side of the grid plate 20. Therefore, the frame strands 21a, 21b and the thick lateral strands 23b and thick longitudinal strands 24b constitute numerous rectangular partitioning frames that are longitudinally and laterally aligned and in which the top surface of the grid plate is opened, and these partitioning frames longitudinally and laterally partition the surface of the grid plate 20. When the surface of the grid plate is so partitioned by the numerous partitioning frames, the active material can be made to flow smoothly and uniformly from the top surface side of the grid plate to the reverse surface side because the pressure for packing the active material applied to the surface of the grid plate can be reliably and uniformly transmitted without dissipation through limited regions inside the partitioning frames to the reverse surface side of the grid plate. The flow of active material to the reverse surface side of the grid plate 20 is facilitated, and the active material can be satisfactorily packed on the reverse surface side of the grid plate because the end faces 24b2 of the thick longitudinal strands 24b and the end faces 24a2 of the thin longitudinal strands 24a in the thickness direction are arranged further inward from the end faces 21a2, 21b2 of the frame section in the thickness direction of the frame section; and a gap is formed between the conveyor belt 41b, and the end faces 24b2 of the thick longitudinal strands 24b and the end faces 24a2 of the thin longitudinal strands 24a in the thickness direction during packing of the active material.

In the grid plate 20 used in the lead acid storage battery according to the present invention, the end faces of the thick lateral strands 23b and thick longitudinal strands 24b in the thickness direction are arranged in the same plane as the end faces of the frame section 21 in the thickness direction on the top surface side of the grid plate. However, active material is readily applied so as to hide the thick lateral strands and the thick longitudinal strands when the active material is being packed into the grid plate on the top surface side. Therefore, the active material is readily packed into the grid plate so that the thick lateral strands and thick longitudinal strands are not exposed, even when the end faces of the thick lateral strands and thick longitudinal strands in the thickness direction and the end faces of the frame section in the thickness direction are arranged in the same plane.

The end faces 23b2 of the other end side of the thick lateral strands 23b in the thickness direction are arranged in the same plane in which the end faces of the other end side of the frame section 21 in the thickness direction are arranged on the reverse surface side of the grid plate 20. Therefore, the end faces 23b2 of the thick lateral strands 23b in the thickness direction may not be covered with active material and may remain exposed. It is difficult to completely cover the end faces of the thick lateral strands exposed on the reverse surface side of the grid plate by only the flow of the active material from the top surface side to the reverse surface side of the grid plate, but in the present embodiment, the width dimension G of the end faces of the thick lateral strands 23b in the thickness direction on the reverse surface side of the grid plate is set to be less than the width dimension F of the end faces of the thick lateral strands in the thickness direction on the top surface side of the grid plate. Therefore, the surface area of exposed portions can be sufficiently reduced when the end faces 23b2 of the thick lateral strands 23b in the thickness direction are exposed on the reverse surface side of the plate when the active material packing step has ended. For this reason, the exposed portions of the end faces 23b2 of the other end side of the thick lateral strands in the thickness direction can be reliably covered with active material even when end portions of the thick lateral strands are exposed on the reverse surface side of the plate when the active material packing step has ended, and it is possible to readily obtain a plate that does not have exposed portions of the grid strands on the top and reverse surface sides of the grid plate due to the flow of active material produced in the active material compression step carried out thereafter.

[Modified Example]

In the example shown in FIG. 1, longitudinal grid strands are provided so that the thick longitudinal strands and the thin longitudinal strands are aligned in alternating fashion in the lengthwise direction of the lateral frame strands 21a, 21b, but the present invention is not limited to the configuration of the longitudinal grid strands shown in FIG. 1. For example, the longitudinal grid strands may be arranged so that two thin longitudinal strands 24a are aligned adjacent to the thick longitudinal strands 24b.

In the embodiment described above, the main plane of the grid is provided with a first region A1 positioned on the lateral grid strand side on which the plate lug section is provided, and a second region A2 positioned on the other lateral grid strand side, which is the side set at a distance from the plate lug section. The main plane of the grid plate is divided into two regions in the longitudinal direction (into upper and lower regions). In the first region, four thin lateral strands are aligned to the sides of each thick lateral strand, and in the second region, three thin lateral strands are aligned to the sides of each thick lateral strand. However, the present invention is not limited by the embodiment described above.

In order to prevent the electrical resistance from increasing in the region set at a distance from the plate lug section 25, the grid strands can be arranged so that the ratio of the number of thin lateral strands disposed in a fixed unit area in relation to the number of thick lateral strands in a region near the other of the lateral frame strands set at a distance from the plate lug section is less than the ratio of the thin lateral strands in a fixed unit area in relation to the number of thick lateral strands in a region adjacent to the one lateral frame strand to which the plate lug section is provided, but the ratio of the number of thick lateral strands to the number of thin lateral strands in the regions of the main plane of the grid plate is not limited to the example described above.

For example, one or more regions may be established between the first region A1 and the second region A2 to divide the main plane of the grid plate into three or more regions, and the number of thin lateral strands and the number of thick lateral strands in each region may be set so that the ratio of the number of thin lateral strands to the number of thick lateral strands provided per fixed unit area is reduced in a stepwise fashion in progression from the region disposed on one lateral grid strands side on which the plate lug section is disposed to the region disposed on the other lateral frame section side (i.e., so that the distance between thick lateral strands is reduced in a stepwise fashion).

EXAMPLES

Fabrication of a Grid Plate

Tin (1.0 to 1.8 mass %) and calcium (0.05 to 0.1 mass %) were admixed with lead and the fabricated lead alloy was melted. Positive grid plates A and B were fabricated by gravity die casting using two different types of molds. Grid plate A is a comparative example, and the grid plate B is an example of the present invention.

Grid Plate A

Comparative Example

Grid plate A is a grid plate having the structure proposed in the prior art by the inventor (see WO (International Publication) 2010/73588). In grid plate A, the array pattern of the lateral grid strands 23 and the longitudinal grid strands 24 inside the frame section 21 is the same as the example shown in FIG. 1, but the thickness of the thick lateral strands 23b and the thick longitudinal strands 24b in grid plate A is set to be less than the thickness of the frame section 21, and the end face 23b1 of one end side and the end face 23b2 of the other end side of the thick lateral strands 23b in the thickness direction are arranged further inward in the thickness direction than the end faces 21a1, 21b1 of one end side and the end faces 21a2, 21b2 of the other end side of the frame section 21 in the thickness direction. The end face 24b1 of one end side and the end face 24b2 of the other end side of the thick longitudinal strands 24b in the thickness direction are arranged further inward in the thickness than the end faces 21a1, 21b1 of one end side and the end faces 21a2, 21b of the other end side of the frame section 21 in the thickness direction. The width and thickness of the thin lateral strands 23a are set to be less than the width and thickness of the thick lateral strands 23b, and the width and thickness of the thin longitudinal strands 24a are set to be less than the width and thickness of the thick longitudinal strands 24b. The thin lateral strands 23a and the thin longitudinal strands 24a are disposed in a state in which the end faces of one end side thereof in the thickness direction are positioned in positions offset from the plane in which the end faces of one end side of the thick lateral strands 23b and thick longitudinal strands 24b in the thickness direction are arranged.

In grid plate A, the longitudinal dimension of the frame section is 385 mm, the lateral dimension is 140 mm, the thickness is 5.8 mm, and the width is 4.4 mm. Formed inside the frame section 21 are lateral grid strands 23 provided with thick lateral strands 23b and thin lateral strands 23a, and longitudinal grid strands 24 provided with thick longitudinal strands 24b and thin longitudinal strands 24a. The cross-sectional shape of the thick longitudinal strands 24b and the thick lateral strands 23b is a hexagonal shape in which the thickness is greater than the width. The thickness is 5.4 mm and the width is 4.3 mm. The cross-sectional shape of the thin longitudinal strands 23a and the thin lateral strands 24a is a hexagon whose thickness is greater than the width. The thickness is 3.6 mm and the width is 2.8 mm. In the grid plate A, the end faces 23a1, 24a1 of one end side in the thickness direction of the thin lateral strands 23a and the thin longitudinal strands 24a, which were arranged facing upward when the active material was being packed, are positioned in the same plane as the end faces 23b1 and 24b1 of the one end side in the thickness direction of the thick lateral strands 23b and the thick longitudinal strands 24b.

Grid Plate B

Example

In grid plate B, the array pattern of the lateral grid strands 23 and the longitudinal grid strands 24 inside the frame section 21 is the same as the example shown in FIG. 1. In the grid plate B, the thickness of the thick lateral strands 23b is set to be equal to the thickness of the frame section 21, as shown in FIG. 2, and the end face 23b1 of one end side and the end face 23b2 of the other end side of the thick lateral strands 23b in the thickness direction are arranged in the same plane as the end faces 21a1, 21b1 of one end side and the end faces 21a2, 21b2 of the other end side of the frame section 21 in the thickness direction. The thickness of the thick longitudinal strands 24b is set to be less than the frame section 21, as shown in FIG. 3; the end face 24b1 of one end side in the thickness direction thereof is arranged in the same plane as the end faces 21a1, 21b1 of one end side of the frame section 21 in the thickness direction; and the end face 24b2 of the other end side in the thickness direction of the thick longitudinal strands 24b is arranged further inward from the frame section in the thickness direction than the end faces 21a2, 21b2 of the other end side of the frame section 21 in the thickness direction.

In grid plate B, the width and thickness of the thin lateral strands 23a are set to be less than the width and thickness of the thick lateral strands 23b, respectively; and the width and thickness of the thin longitudinal strands 24a are set to be less than the width and thickness of the thick longitudinal strands 24b, respectively. The thin lateral strands 23a and the thin longitudinal strands 24a are disposed so that the end faces 23a1, 24a1 of one end side in the thickness direction are positioned further inward than the end faces of one end side of the frame section 21 in the thickness direction, and so that the end faces 23a2, 24a2 of the other end side in the thickness direction are positioned further inward of the frame section in the thickness direction than the end faces of the other end side of the frame section 21 in the thickness direction.

In the grid plate B, the longitudinal dimension of the frame section 21 is 385 mm, the lateral dimension is 140 mm, the thickness is 5.8 mm, and the width is 4.4 mm. Lateral grid strands provided with thick lateral strands 23b and thin lateral strands 23a, and longitudinal grid strands provided with thick longitudinal strands 24b and thin longitudinal strands 24a are formed inside the frame section. The cross-sectional area of the thick lateral strands 23b has a hexagonal shape in which the thickness D is greater than the width E, the thickness D is 5.8 mm, and the width E is 4.3 mm. The width F of the end faces 23b1 of one end side and the width G of the end faces 23b2 of the other end side of the thick lateral strands 23b in the thickness direction are 1.7 mm and 1.0, respectively. The cross-sectional area of the thick longitudinal strands 24b is also a hexagonal shape in which the thickness K is greater than the width L, the thickness K is 5.6 mm, and the width L is 4.3 mm.

The cross-sectional shape of the thin longitudinal strands 24a and thin longitudinal strands 24a were hexagonal, the thicknesses H and N being greater than the widths I and P. The thicknesses H and N are 3.6 mm and the widths I and P are 2.8 mm. In the grid plate B, the end faces 23a1, 24a1 of one end side of the thin lateral strands 23a and thin longitudinal strands 24a in the thickness direction are positioned in the same plane in a position further inward of the frame section in the thickness direction than the end faces of one end side of the frame section 21 in the thickness direction; and the end faces 23a2, 24a2 of the other end side of the thin lateral strands 23a and thin longitudinal strands 24a in the thickness direction are positioned in the same plane in a position further inward of the frame section in the thickness direction than the end faces of the other end side of the frame section 21 in the thickness direction.

[Confirmation of the Packed State of the Active Material]

A packing test of the active material was performed, in which the active material paste was packed into the grid plate A and B by a paste packing machine, and aging and drying were then carried out to fabricate unformed positive plates.

The positive active material paste used in the packing test of the active material was fabricated by admixing 0.1 mass % of polyester fiber in relation to the mass of the lead powder that principally comprised lead monoxide, and then adding and kneading 12 mass % of water and 16 mass % of dilute sulfuric acid. The method for fabricating the positive active material was the same method as used in prior art.

[Packing Results]

The active material paste was packed and compressed into the grid plates A and B, and a visual confirmation of the packed state of the active material on the reverse side of the grid plates, which were facing downward during active material packing, revealed that all of the grid strands were neatly embedded in the active material in both grid plates A and B, and the packing state of the active material on the reverse side of the grid plate was good. In the present invention, the reason that the end faces 23b2 of the thick lateral strands are not exposed on the reverse surface side of the grid plate even though the thickness D of the thick lateral strands 23b is equal to the thickness B of the frame section 21 is thought to be that partitioning frames are formed by the thick lateral strands and thick longitudinal strands on the top surface side of the grid plate, whereby the flow of active material from the top surface side of the grid plate to the reverse surface side is smoothed, and the width G of the end faces 23b2 of the other end side of the thick lateral strands in the thickness direction is made to be less than the end faces 23b1 of one end side of the thick lateral strands in the thickness direction.

[Defects During Active Material Packing]

With grid plate A, the grid plate was placed on a conveyor belt in a state in which the lateral direction of the grid plate faced the conveyance direction and the feed rollers were brought into contact with the grid plate 20 on the conveyor belt, whereby the orientation of the grid plate when the grid plate was fed into the paste packing machine was displaced from the proper orientation, and problems in which the production line was stopped occurred in a ratio of 1.2% of all events. This indicates that 1.2 grid plates per 100 positive plates were defective, and is a rate that cannot be ignored in terms of improving productivity. In contrast, favorable results were obtained with the grid plate B as an example of the present invention in that problems stopping the production line were reduced to a ratio of 0.7%, and problems caused by defective feeding of the grid plate to the paste packing machine were reduced 48% in comparison with the case in which a grid plate of prior art was used.

Based on the results described above, in accordance with the present invention, it is apparent that active material can be satisfactorily packed into a grid plate in a manner similar to when a grid plate proposed in prior art is used; and it is also possible to considerably reduce the number of problems that cause the production line to be stopped when the grid plate is fed to the paste packing machine, relative to when a grid plate of prior art is used.

In the grid plate used in the present invention, the cross-sectional area of the thick lateral strands can be made greater than the cross-sectional area of the thick lateral strands of a grid plate used in a conventional lead acid storage battery, and the cross-sectional area of the thick longitudinal strands and the cross-sectional area of the thin lateral strands and thin longitudinal strands can be made to be the same as the cross-sectional area of the thick longitudinal strands, and the cross-sectional area of the thin lateral strands and the thin longitudinal strands, respectively, of a conventional grid plate. Therefore, it is apparent that the lead acid storage battery according to the present invention has service life characteristics that are equal to or greater than those of a conventional lead acid storage battery.

INDUSTRIAL APPLICABILITY

The present invention is configured so that the grid plate can be smoothly fed into the paste packing machine; therefore, it is less likely that the production line will be stopped by a grid plate that cannot be properly fed into the paste packing machine, and plate productivity can be improved. According to the present invention, moreover, the grid plate can be provided with a structure that can withstand long-term corrosion and a structure that facilitates the packing of active material. Therefore, it is possible to extend the service life of a plate, more particularly a positive plate, and obtain a valve regulated lead acid storage battery that has a longer service life.

The invention claimed is:

1. A lead acid storage battery comprising a positive plate in which a positive active material is packed into a grid plate for a positive plate, and a negative plate in which a negative active material is packed into a grid plate for a negative plate, wherein
   at least the grid plate for the positive plate comprises: a frame section having a pair of lateral frame strands that extend in a lateral direction and are in an opposing arrangement in a longitudinal direction, and a pair of longitudinal frame strands that extend in the longitudinal direction and that are in an opposing arrangement in the lateral direction, and having a fixed thickness dimension in a thickness direction perpendicular to the lateral direction and the longitudinal direction; a plurality of lateral grid strands and a plurality of longitudinal grid strands that are provided so as to extend parallel to the lateral frame strands and the longitudinal frame strands, respectively, and form a grid inside the frame section; and a plate lug section integrally formed on one lateral frame strand of the frame section,
   the plurality of longitudinal grid strands and the plurality of lateral grid strands respectively have a plurality of thin longitudinal strands and a plurality of thin lateral strands, and a plurality of thick longitudinal strands and a plurality of thick lateral strands that have a greater cross-sectional area than the plurality of thin longitudinal strands and the plurality of thin lateral strands, and the plurality of thick lateral strands and the plurality of thin lateral strands are arrayed so that at least one thin longitudinal strand of the plurality of this longitudinal strands is aligned with a side of the plurality of thick longitudinal strands, and the plurality of thin lateral strands are aligned with a side of the plurality of thick lateral strands,
   the plurality of thick longitudinal strands has a thickness that is less than the fixed thickness dimension of the frame section, the plurality of thick longitudinal strands being arranged so that an end face of one end side of the plurality of thick longitudinal strands in the thickness direction is positioned in the same plane as an end face of one end side of the frame section in the thickness direction, and an end face of another end side of the plurality of thick longitudinal strands in the thickness direction is positioned further inward of the frame section in the thickness direction than an end face in another end side of the frame section in the thickness direction,
   the plurality of thin longitudinal strands has a thickness that is less than the thickness of the plurality of thick longitudinal strands, the plurality of thin longitudinal strands being arranged so that an end face of one end side of the plurality of thin longitudinal strands in the thickness direction and an end face of another end side of the plurality of thin longitudinal stands in the thickness direction are positioned further inward of the frame section in the thickness direction than the end face of the one end side and the end face of the another end side of the plurality of thick longitudinal strands in the thickness direction,
   the plurality of thick lateral strands have a thickness equal to the fixed thickness dimension of the frame section, the plurality of thick lateral strands being arranged so that an end face of the plurality of thick lateral strands on one end side in the thickness direction and an end face of the plurality of thick lateral strands on another end side in the thickness direction are positioned in the same plane as an end face of one end side and an end face of another end side of the frame section in the thickness direction, respectively,
   a width dimension of the end face of the another end side of the plurality of thick lateral strands in the thickness direction is set to be less than a width dimension of the end face of the one end side in the thickness direction of plurality of thick lateral strands, where a direction perpendicular to the thickness direction and the lengthwise direction of the plurality of thick lateral strands is taken as the width direction, and
   the plurality of thin lateral strands has a thickness that is less than the thickness of the plurality of thick lateral strands, the plurality of thin lateral strands being arranged so that an end face of the plurality of thin lateral strands on one end side in the thickness direction and an end face of plurality of thin lateral strands on another end side in the thickness direction are positioned further inward of the frame section in the thickness direction than the end face of the one end side and the end face of the another end side of the plurality of lateral strands in the thickness direction.

2. The lead acid storage battery of claim 1, wherein each of the plurality of thin longitudinal strands and each of the plurality of thin lateral strands has a cross-sectional area set so that the lead acid storage battery can withstand corrosion for a predetermined service life period.

\* \* \* \* \*